United States Patent
Taniguchi et al.

Patent Number: 5,187,943
Date of Patent: Feb. 23, 1993

[54] CONTROL APPARATUS FOR AIR-CONDITIONER

[75] Inventors: Yousuke Taniguchi, Nagoya; Tadayuki Miyawaki, Kagoshima; Hisashi Tanaka; Motohiro Kitada, both of Anjo, all of Japan

[73] Assignees: Kabushiki Kaisha Toyota Chuo Kenkyosho, Nagakute; Nippondenso Co., Ltd., Kariya, both of Japan

[21] Appl. No.: 747,943

[22] Filed: Aug. 21, 1991

[30] Foreign Application Priority Data

Aug. 24, 1990 [JP] Japan .................................. 2-223321

[51] Int. Cl.$^5$ ........................................... F25D 17/00
[52] U.S. Cl. ..................................... 62/180; 236/49.3; 236/91 C
[58] Field of Search ................ 62/180, 229; 236/49.3, 236/91 C

[56] References Cited

FOREIGN PATENT DOCUMENTS 57-37642  3/1982  Japan .
0047144   3/1982  Japan .................................. 236/1 R
1229713   9/1989  Japan .

Primary Examiner—William E. Wayner
Attorney, Agent, or Firm—Cushman, Darby & Cushman

[57] ABSTRACT

The temperature and velocity of a wind blown from an air-conditioner are controlled in such a manner that a temperature sensation value TS expressed by the following formula becomes a targeted temperature sensation value by using facial skin temperature $t_{SK}$ and a rate of change in the facial skin temperature, $t'_{SK}$: $TS = A(t_{SK} - B) + Ct'_{SK}$, where A is a coefficient in the range of 0.4–1.0; B is a coefficient in the range of 32.8–35.0; and C is a coefficient in the range of 10.0–85.0.

14 Claims, 23 Drawing Sheets

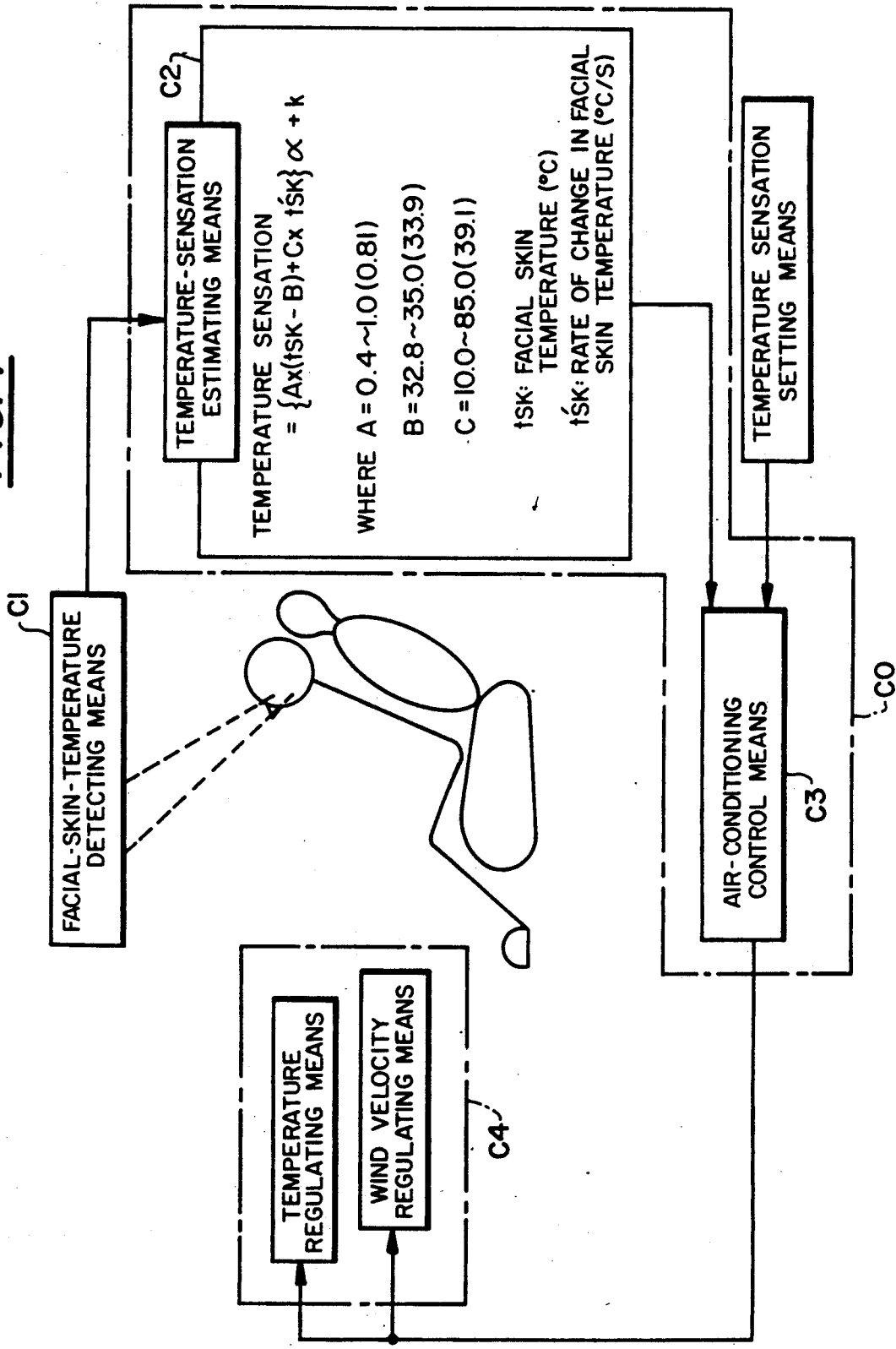

ERROR IN ESTIMATION OF TEMPERATURE SENSATION

CONTROL APPARATUS FOR AIR-CONDITIONER

BACKGROUND OF THE INVENTION

Field of the Invention

The present invention relates to a control apparatus for controlling the operation of an air-conditioner used in automobiles and the like or in offices or the like, and, more particularly, to a control apparatus for an air-conditioner capable of effecting comfortable air-conditioning both when human skin temperature undergoes change, such as during air-conditioning starts and fluctuations in thermal load, and when skin temperature remains stable.

Description of the Related Art

Prior art disclosed in Japanese Patent Application Laid-Open Nos. 57-37642 and 1-229713 has served as a basis for the present invention. In these prior arts, the human skin temperature is used as an index for air-conditioning control so as to effect comfortable air-conditioning.

In the prior art disclosed in Japanese Patent Application Laid-Open No. 57-37642, human facial skin temperature is held at 33° C. (a fixed value) in a vehicle using an air-conditioner. With this technique, however, since facial skin temperature is merely controlled to a fixed value, the following drawbacks exist.

(1) Comfortable air-conditioning control cannot be achieved in a situation in which skin temperature changes transiently during an early period after starting an air-conditioner, this transient state of skin temperature being hereinafter referred to as a nonsteady state.

(2) Since no air-conditioning control method is provided for a case where facial skin temperature deviates from a targeted value owing to fluctuations in thermal load due to exposure to the sun's rays or the like, it is impossible to control facial skin temperature to a targeted value through appropriate control.

(3) It has been confirmed through the present inventors' investigation that the skin temperature in a comfortable state which is said to be 33° C. or thereabouts is the mean temperature of the skin of the entire body in a steady state and does not apply to facial skin temperature. Accordingly, with this prior art, it is impossible to achieve comfortable air-conditioning. The mean skin temperature referred to herein is one used in physiology and is a value obtained by measuring skin temperature at a number of spots and weight-averaging the measurements by using areas of the respective body parts as weights, so as to show an average of the skin temperatures which are not uniform at respective body parts.

Meanwhile, in the prior art disclosed in Japanese Patent Application Laid-Open No. 1-229713, in order to cope with transient changes in the skin temperature (nonsteady state), air-conditioning control is effected in correspondence with cases where skin temperature remains steady and cases where it changes transiently, by using a temperature-sensation determining means employing a temperature-sensation estimating formula $(S = aT_s + b\dot{T}_s + c\Sigma T_s + d$, or a modification of this formula) using skin temperatures and a rate of change in skin temperature. With this technique, however, the following drawbacks exit.

(1) It is stated in the aforementioned publication that a body part subject to skin temperature measurement is a part which represents the mean skin temperature of the entire body. However, it has been revealed as a result of the present inventors' investigation that, in a thermal environment in which distributions of such as temperature and wind velocity are created in the surroundings of a human being as in the case of automobile air-conditioning, the body part which represents the mean skin temperature of the entire body shifts depending on the mode of air conditioning use, including heating and cooling. As a result, the body part subject to measurement of skin temperature cannot be confined to a specific part. Hence, this causes the control accuracy of heating and cooling to decline.

(2) The human skin temperature varies for each body part, and the manner in which the skin temperature changes varies for each body part to which air-conditioning is provided. Accordingly, in a case where air-conditioning control is effected by estimating (determining) the temperature sensation by utilizing skin temperature, it is necessary to use the relationship between the skin temperature and the temperature sensation that vary for each body part measured. In this prior art, however, no consideration is given in this respect.

(3) It is known from literature in the field of thermophysiology that factors determining the temperature sensation of human beings are skin temperature, rate of change in skin temperature, and the like. In this prior art, however, specific examples of coefficients of a formula for determining the temperature sensation are not shown and, in practice, trials and errors are needed to control air-conditioning by determining the temperature sensation.

As described above, according to the prior art in which human skin temperature is set as an index of air-conditioning control, it is impossible to effect air-conditioning control capable of maintaining the user's temperature sensation in a comfortable state both when the skin temperature is steady and when it is nonsteady, and thus it is impossible to effect air-conditioning control practically.

SUMMARY OF THE INVENTION

In view of the above, it is an object of the present invention to provide a control apparatus for an air-conditioner capable of maintaining the user's temperature sensation in a comfortable state during both steady and nonsteady states of skin temperature in air-conditioning control in which skin temperature is set as an index, by accurately estimating the temperature sensation from the relationship between characteristics of the human temperature sensation and characteristics of skin temperature.

To achieve the above-mentioned object, in accordance with the present invention, as shown in FIG. 1, there is provided a control apparatus for an air-conditioner, comprising: facial-skin-temperature detecting means C1 for detecting a skin temperature of a human face; and control means C0 for controlling the air-conditioner C4 in such a manner that a temperature sensation value TS expressed numerically by the following formula becomes a targeted temperature sensation value:

$$TS = \{A(t_{SK}-B) + C \cdot t'_{SK}\}\alpha + K$$

where A is a coefficient in the range of 0.4–1.0 indicating a difference (gradient) in a temperature sensation value with respect to a difference in the facial skin temperature; B is a coefficient in the range of 32.8–35.0 for making the facial skin temperature and the temperature sensation value correspond to the difference in the temperature sensation value determined by the coefficient A; C is a coefficient in the range of 10.0–85.0 indicating a contribution of the rate of change in the skin temperature to the temperature sensation value; $t_{SK}$ is a facial skin temperature; $t'_{SK}$ is a rate of change in the facial skin temperature; $\alpha$ is a value corresponding to an interval between adjacent temperature sensation values; and K is a reference value of the temperature sensation value. The unit of facial skin temperature may be °C., for instance, and the unit of the rate of change may be °C./s, but °F. or other similar unit systems may be used.

As for the temperature sensation value TS, if the temperature sensation of being neither warm nor cool, i.e., a neutral temperature sensation, is used as a reference, and if the reference value K at that time is set as 0 and the value $\alpha$ corresponding to an interval between adjacent temperature sensation values is set at 1, and if the temperature sensation value TS is determined such that the temperature sensation value TS becomes greater as the temperature sensation changes from the neutral temperature sensation toward a higher temperature sensation, and becomes smaller as the temperature sensation changes toward a lower temperature sensation, then the temperature sensation value TS can be expressed as follows:

5: very hot, 4: hot, 3: slightly hot
2: warm, 1: slightly warm, 0: neither warm nor cool,
−1: slightly cool, −2: cool, −3: slightly cold,
−4: cold, −5: very cold It should be noted that the reference value K may be determined in correspondence with any of the aforementioned temperature sensations, and may be a value other than 0. In addition, the value $\alpha$ may be a value other than 1 and may be given by a variable which becomes greater as its value increases with respect to the reference value.

The basic principle of the present invention will be described hereinafter. FIGS. 2 and 3 show changes in the temperature sensation value during air-conditioning obtained from a sensory test and changes in skin temperature at various parts of a human body. Specifically, FIGS. 2 and 3 show a case of cooling and a case of heating, respectively, in automobile air-conditioning. Facial skin temperature exhibits a well-corresponding tendency of change during both cooling and heating with respect to changes in the temperature sensation value. For other parts (hands, legs, trunk), however, the skin temperature does not change, or exhibits changes unlike the changes of the temperature sensation value. As can be appreciated from FIGS. 2 and 3, in case where air-conditioning control is effected by using the skin temperature as a control index, the estimation of the temperature sensation value is utterly impossible if a skin temperature other than facial skin temperature is used, or the accuracy of estimation of the temperature sensation value is poor. For instance, the skin temperature of a hand, which corresponds relatively well to the changes in the temperature sensation value during cooling, varies in a manner opposite to the tendency of change in the temperature sensation value during heating. In addition, the skin temperature of a leg during heating can correspond to different temperature sensation values. Accordingly, unless it is specified that the formula for estimating the temperature sensation value corresponds to the skin temperature of a specific part of the body, the temperature sensation value cannot be estimated accurately.

As a result of sensory evaluation tests conducted by the present inventors by using a multiplicity of subjects, it was verified that facial skin temperature exhibits the greatest correlation with the temperature sensation value, and that the temperature sensation value can be estimated with high accuracy during the states of non-steady and steady skin temperature by using a simple formula in which facial skin temperature and the rate of change in the facial skin temperature are set as variables. In addition, it was also confirmed that this estimation formula can be applied to both cooling and heating.

As a result of the test conducted by the present inventors, the following formula was found to be optimal as the aforementioned simple formula:

$$TS = \{A(t_{SK}-B) + C \cdot t'_{SK}\}\alpha + K \qquad (1)$$

where A is a coefficient in the range of 0.4–1.0; B is a coefficient in the range of 32.8–35.0; C is a coefficient in the range of 10.0–85.0; $t_{SK}$ is a facial skin temperature (e.g., °C.); $t'_{SK}$ is a rate of change in the facial skin temperature (e.g., °C./s); $\alpha$ is a value corresponding to an interval between adjacent temperature sensation values; and K is a reference value of the temperature sensation value.

It should be noted that although the coefficients A, B, and C are preferably 0.81, 33.9, and 39.1, respectively, the coefficients may be altered in the aforementioned ranges so as to correspond to the difference in the temperature sensation among individuals.

Accordingly, in the present invention, human facial skin temperature is detected by the facial-skin-temperature detecting means C1, and the air-conditioner C4 is controlled by the control means C0 in such a manner that the temperature sensation value becomes a targeted temperature sensation value. This targeted temperature sensation value may be set by targeted temperature setting means.

As described above, in accordance with the present invention, since a temperature-sensation estimating formula in which facial skin temperature having a strong correlation with the temperature sensation during both cooling and heating is set as a variable is used, it is possible to confine the skin-temperature-detecting part to one body part and use only one temperature-sensation estimating formula. Since air-conditioning control is effected by using the skin temperature as an index on the basis of this temperature-sensation estimating formula, it is possible to obtain the advantage that the air-conditioner can be controlled such that the user's temperature sensation can be maintained in a comfortable state during air-conditioning starts and fluctuations in thermal load when human skin temperature undergoes change, as well as during a steady state when skin temperature remains stable.

As shown in FIG. 1, the aforementioned control means C0 may comprise temperature-sensation estimating means C2 for estimating the temperature sensation value TS in accordance with Formula (1) on the basis of an output of the facial-skin-temperature detecting means C1; and air-conditioning control means C3 for controlling the air-conditioner C4 in such a manner that the temperature sensation value TS estimated by the temperature-sensation estimating means becomes a targeted temperature sensation value.

In addition, a rate of change in facial skin temperature for attaining the targeted temperature sensation value may be calculated on the basis of Formula (1) and present facial skin temperature detected by the facial-skin-temperature detecting means, and the air-conditioner may be controlled in such a manner that the temperature sensation value becomes the targeted temperature sensation value on the basis of the rate of change in the facial skin temperature thus calculated.

Furthermore, a targeted facial skin temperature persisting after the lapse of a predetermined time for attaining the targeted temperature sensation value may be calculated on the basis of Formula (1) and the present facial skin temperature detected by the facial-skin-temperature detecting means, and the air-conditioner may be controlled in such a manner that the temperature sensation value becomes the targeted temperature sensation value on the basis of the targeted facial skin temperature thus calculated. In this case, if it is assumed that the targeted facial skin temperature is $t^*_{SK}$ and the predetermined time is $\Delta\tau$, the rate of change in the facial skin temperature, $t'_{SK}$, can be expressed by $t'_{SK} = (t^*_{SK} - t_{SK})/\Delta\tau$. Hence, if $t'_{SK}$ is substituted in the aforementioned Formula (1), and the temperature sensation value TS is set as a targeted temperature sensation value $TS_0$ so as to obtain $t^*_{SK}$, the targeted facial skin temperature $t^*_{SK}$ can be obtained from Formula (1). The above and other objects, features and advantages of the present invention will become more apparent from the following detailed description of the invention when read in conjunction with the accompanying drawings.

BRIEF DESCRIPTION OF THE DRAWINGS

FIG. 1 is a block diagram in accordance with the present invention;

DESCRIPTION OF THE PREFERRED EMBODIMENTS

Referring now to the accompanying drawings, a detailed description will be given of the preferred embodiments of the present invention.

First Embodiment

Figure 2A:
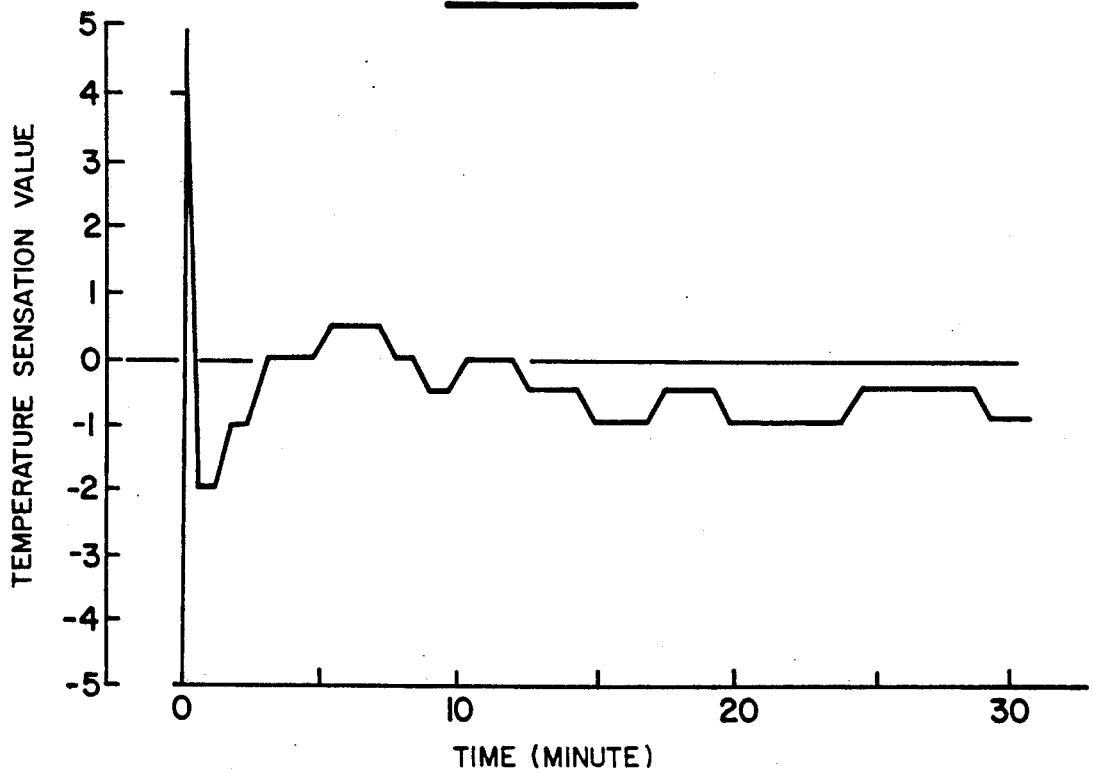
FIG. 2 is a diagram illustrating changes in skin temperature and the temperature sensation value during cooling.
Figure 2B:
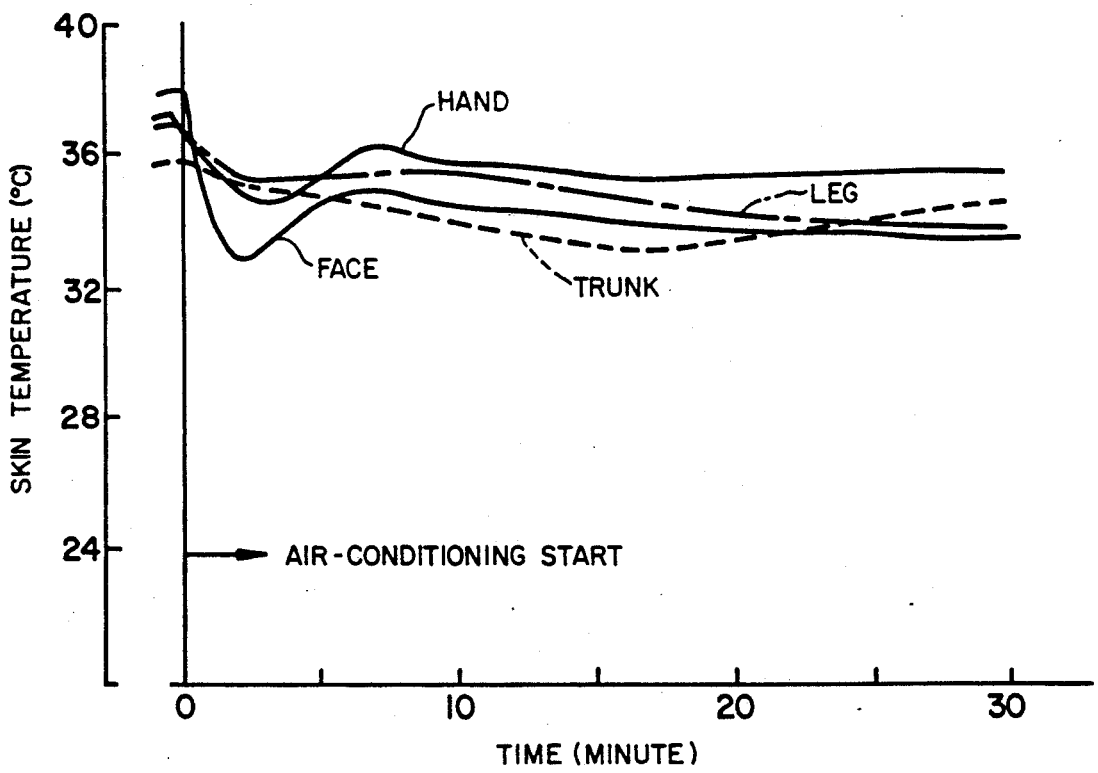
Figure 3A:
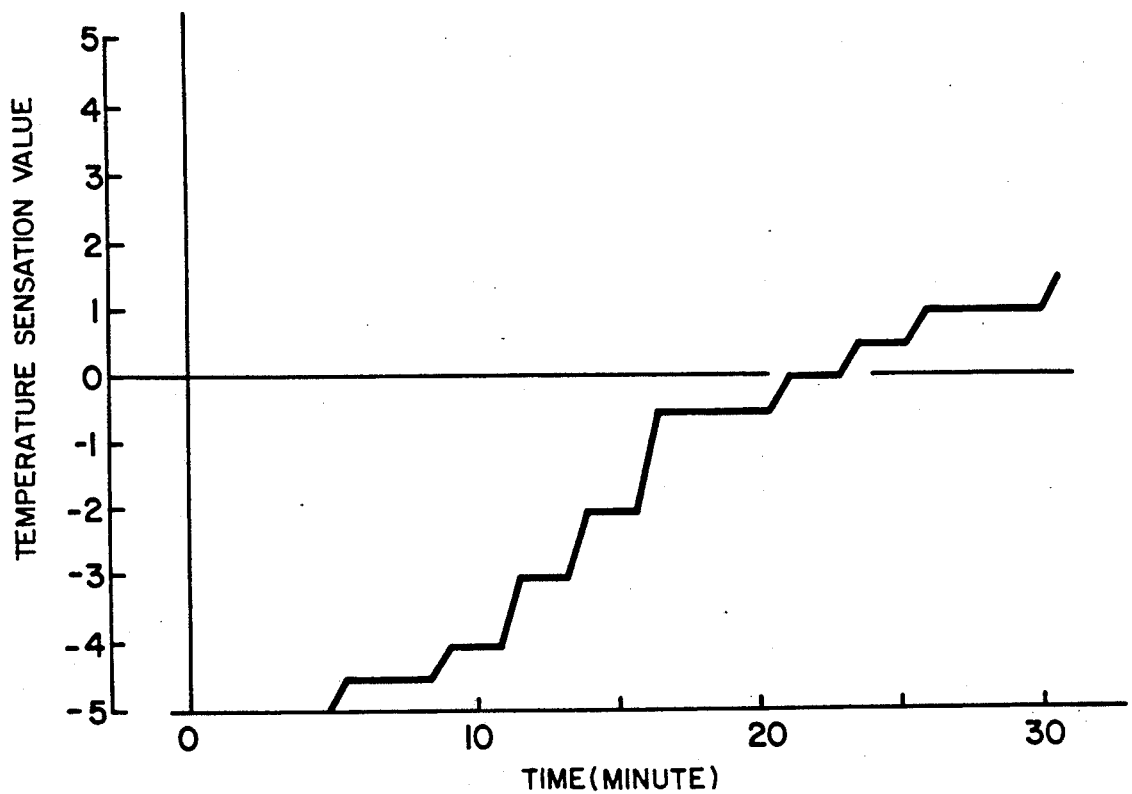
FIG. 3 is a diagram illustrating changes in skin temperature and the temperature sensation value during heating.
Figure 3B:
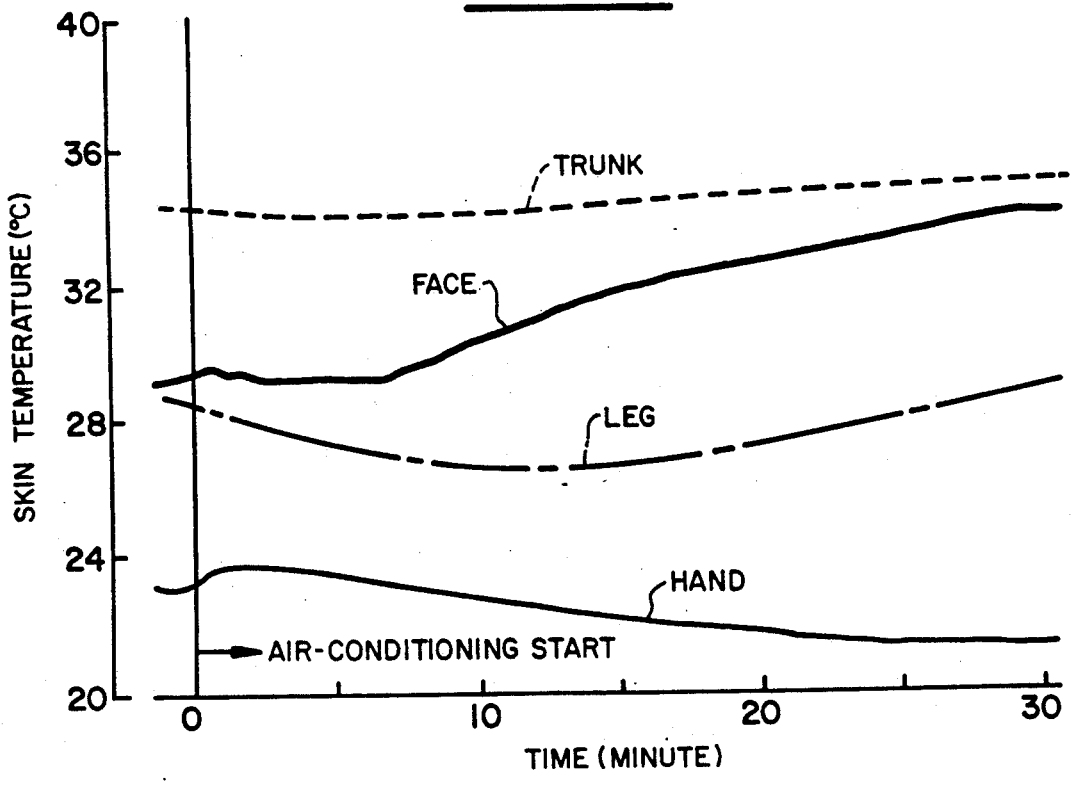
Figure 4:
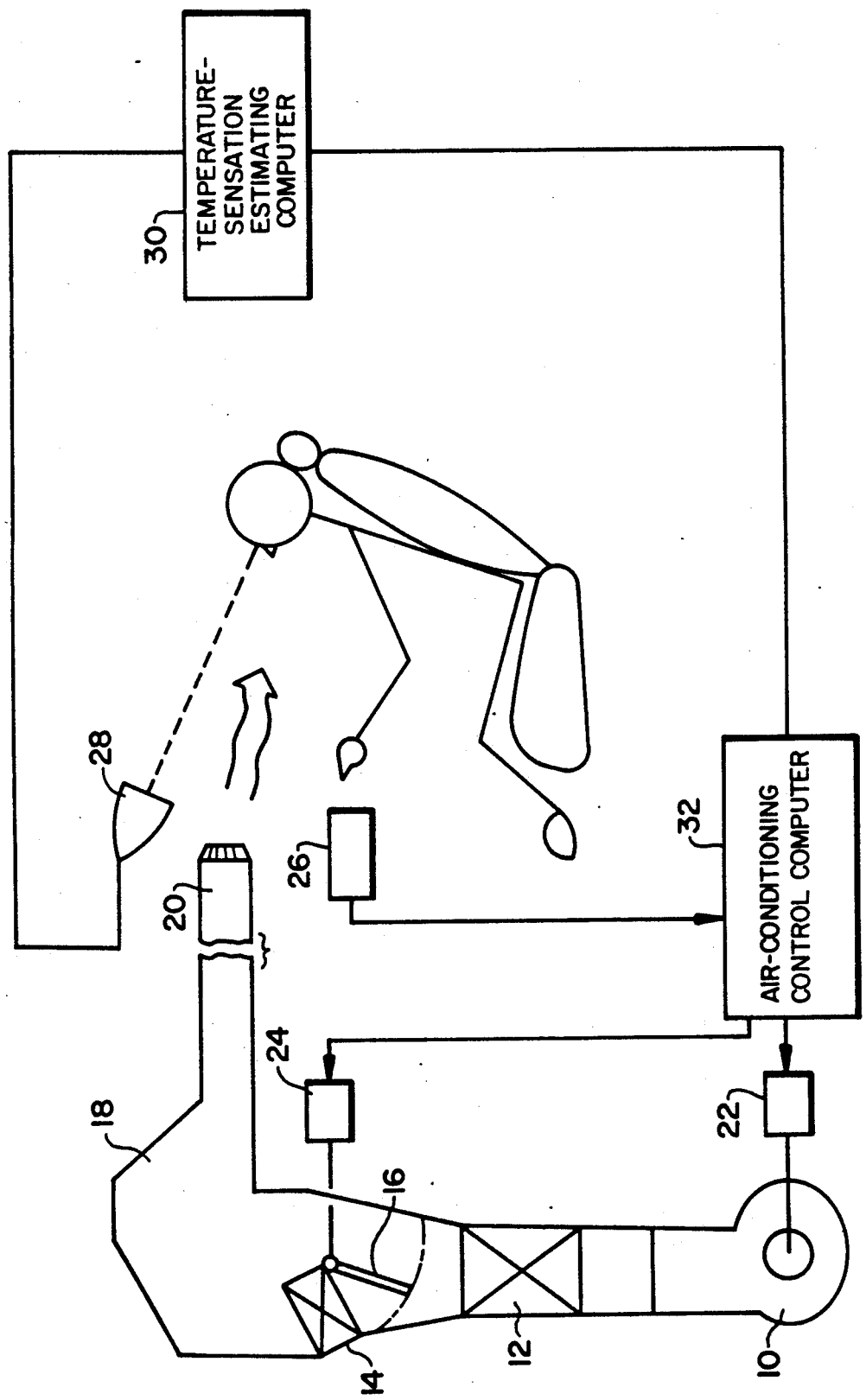
FIG. 4 is a block diagram in accordance with a first embodiment of the present invention.

In this embodiment, the present invention is applied to an air-conditioner for vehicle use. As shown in FIG. 4, the vehicle-use air-conditioner comprises a blower 10, an evaporator 12 which is a part of a refrigerating cycle (not shown), and a heater core 14 for heating air with warm water from an engine-cooling system (not shown). Disposed between the evaporator 12 and the heater core 14 is an air mix damper 16 for regulating an amount of air passing through the heater core 14 after being cooled through the evaporator 12. Disposed downstream from the heater core 14 is an air mix chamber 18 for mixing the air heated by the heater core 14 after passing through the evaporator 12 with the air which failed to pass through the heater core 14 after passing through the evaporator 12. An air outlet 20 oriented toward an occupant's face is disposed at a downstream end of the air mix chamber 18. The voltage applied to the blower 10 is regulated by a blower voltage regulator 22, and the opening of the air mix damper 16 is regulated by an air mix opening regulator 24.

A facial skin temperature detector 28 constituted by an infrared radiation thermometer is disposed at a position at which the occupant's facial skin temperature is detectable. This facial skin temperature detector 28 is connected to a temperature-sensation estimating computer 30 for estimating a temperature sensation value through a temperature-sensation estimating formula which will be described later. The computer 30 is connected to an air-conditioning control computer 32 for controlling the opening of the air mix damper 16 by controlling the air mix damper opening regulator 24. Connected to this air-conditioning control computer 32 is a device 26 for inputting a targeted temperature sensation value $TS_0$ thereinto. The following formula for estimating a temperature sensation value is stored in advance in the temperature-sensation estimating computer 30:

$$TS = A \times (t_{SK} - B) + C \times t'_{SK} \qquad (2)$$

where A, B, and C are coefficients; $t_{SK}$ is a facial skin temperature; and $t'_{SK}$ is a rate of change in the facial skin temperature. In addition, the unit of facial skin temperature $t_{SK}$ is °C., while the unit of the rate of change in facial skin temperature, $t'_{SK}$, is °C./s. The aforementioned Formula (2) is derived from setting the reference value K in Formula (1) to 0 and $\alpha$ to 1.

Figure 5:
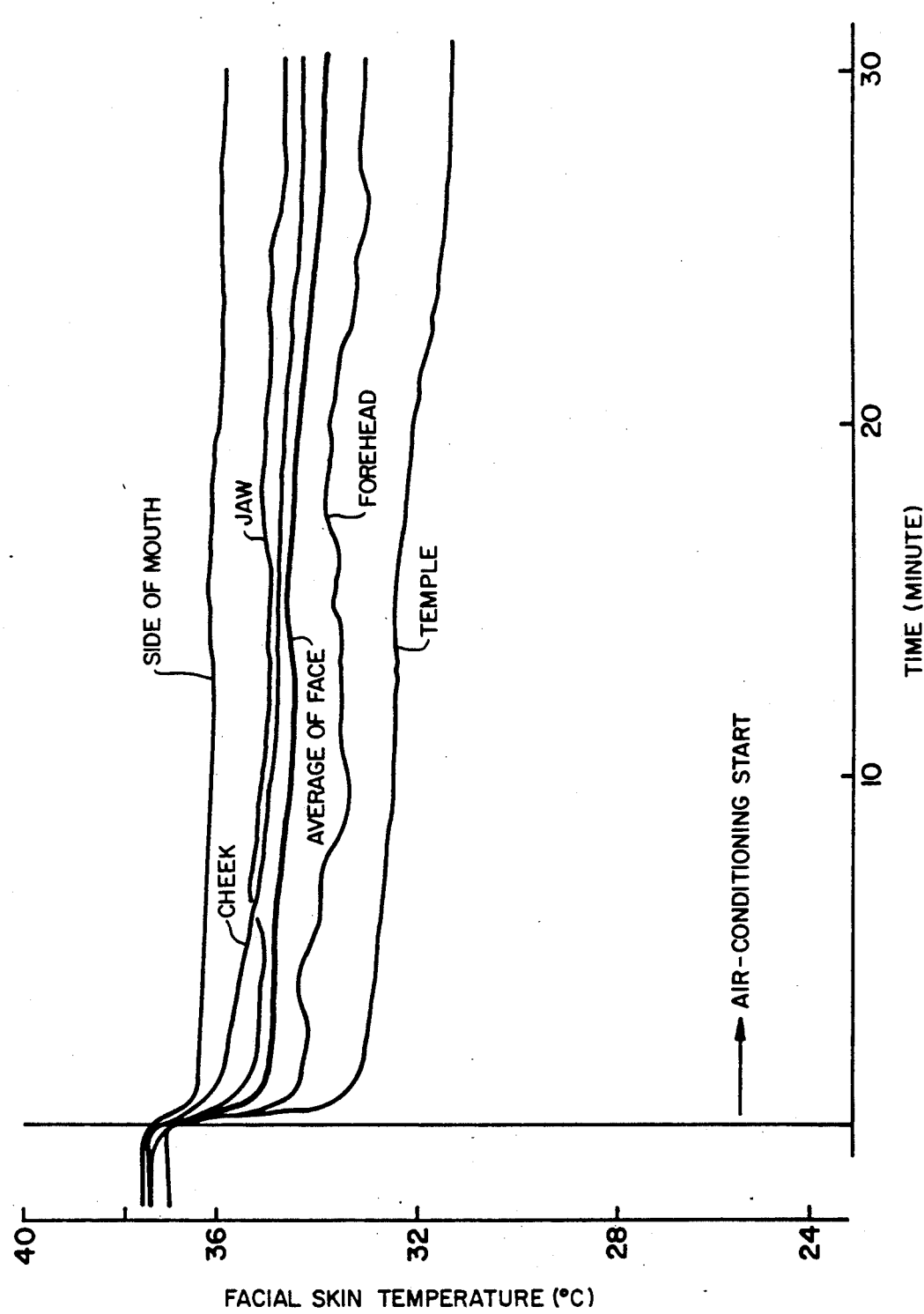
FIG. 5 is a diagram illustrating changes in skin temperature on various parts of a face.
Figure 6:
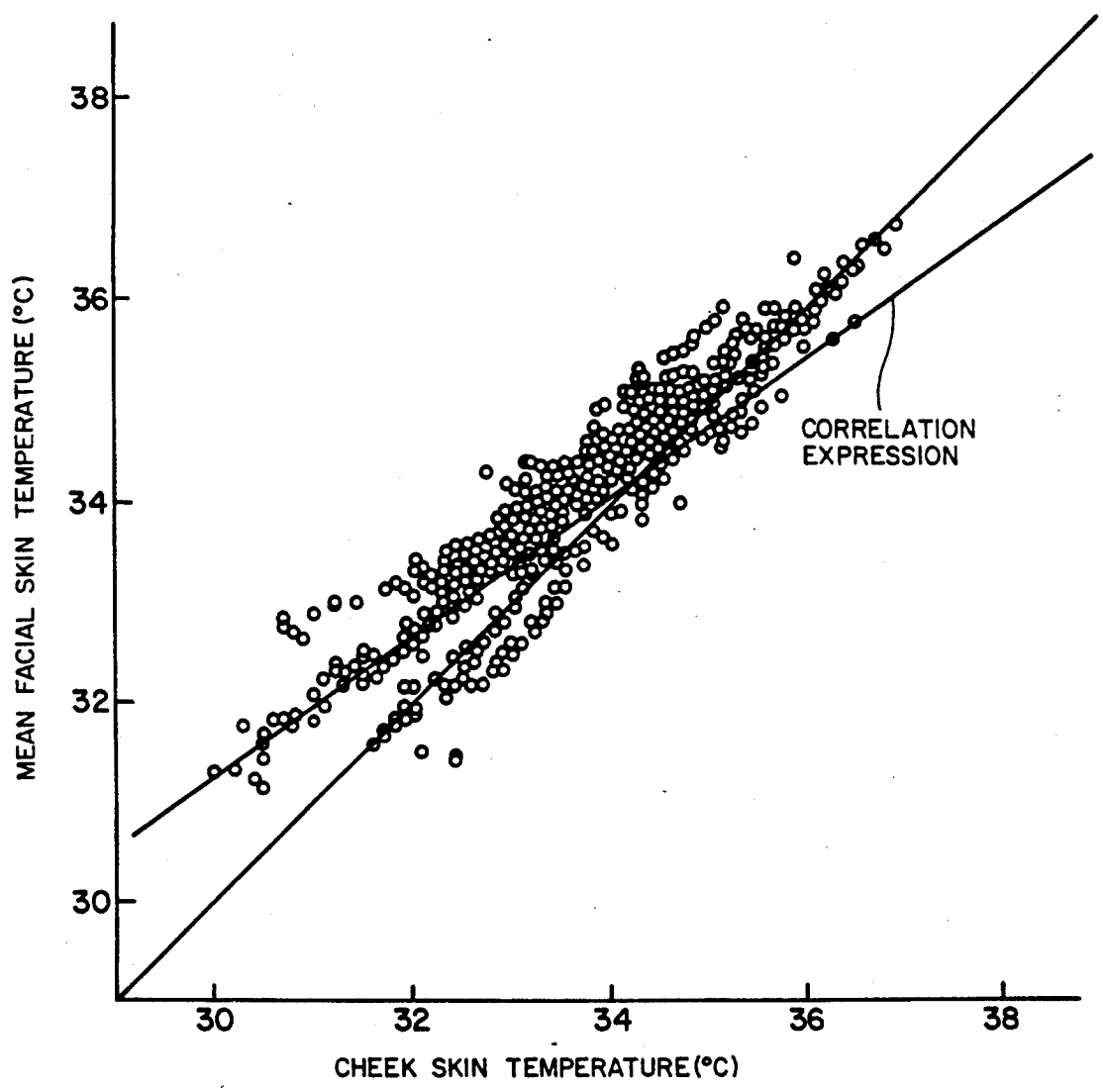
FIG. 6 is a diagram illustrating correlations between skin temperature of the cheek and the mean skin temperature of the face.

A description will be given hereinunder of Formula (2). When measured, differences in skin temperature among the various parts of the face may be detected. However, as shown in FIG. 5, these skin temperatures, whether at a side of the mouth, a cheek, a jaw, the forehead, or the temple, tend to change in the same way during air-condition In other words, there are no cases in which the tendency of change in the temperature sensation value and the tendency of change in the skin temperature become mutually opposite as with the skin temperature of the hands or that of the legs, or in which two temperature sensation values correspond to one skin temperature. Accordingly, in handling facial skin temperature, it suffices if a formula for estimating a temperature sensation value is prepared in advance by using a mean value measured at a plurality or a multiplicity of places on the face, and if a temperature sensation value is estimated by converting the temperature of each detected part to a mean facial skin temperature from correlations between the mean facial skin temperature and the temperature of each detected part. FIG. 6 shows correlations between the skin temperature of the cheek and the mean facial skin temperature. In addition, in a case where a part of the face subject to skin temperature measurement can be specified, it suffices if a formula for estimating a temperature sensation value using the skin temperature of that detected part is set as a variable and is prepared in advance.

It is known from literature in the field of thermophysiology that major factors determining temperature sensation values are the skin temperature and the rate of change in the skin temperature. That is, qualitatively speaking, the temperature sensation of a human being depends partly on the skin temperature, i.e., the higher the skin temperature, the warmer or hotter he or she feels, whereas the lower the skin temperature, the cooler or colder he or she feels. On the other hand, in terms of the rate of change in the skin temperature, when the skin temperature is high, for instance, he or she will feel cool when the skin temperature decreases, whereas when the skin temperature is low, he or she will feel warm when the skin temperature rises. As an example of the former case, a person who is outdoors during summer feels immediately cool upon getting in the shade. At that time, there is no influence of exposure to the sun's rays, so the person feels cool as the skin temperature begins to decrease, despite the fact that the skin temperature itself is relatively high. However, if that same person stays in the shade for a long time, the skin temperature will stabilize, and the person will no longer feel as cool as he or she felt earlier, and will feel hot again despite the fact that the ambient temperature, air current velocity, humidity, and the like remain unchanged. This sort of experience is quite common for all people. As described above, although it has been said regularly that the major factors for temperature sensation are skin temperature and the rate of change in the skin temperature, no attempts have been made to relate these factors quantitatively to actual utilization in air-conditioning control.

Figure 7:
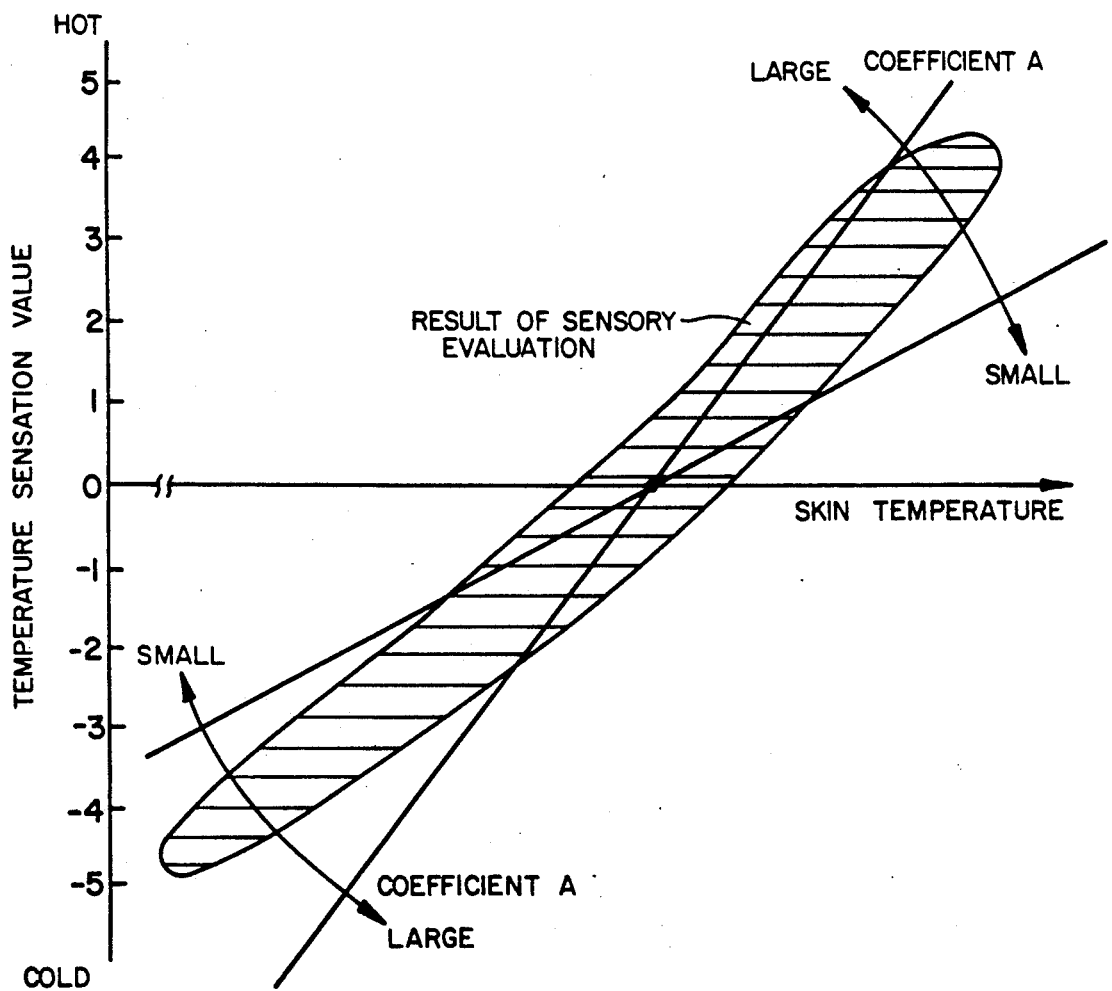
FIG. 7 is a diagram illustrating a coefficient A.
Figure 8:
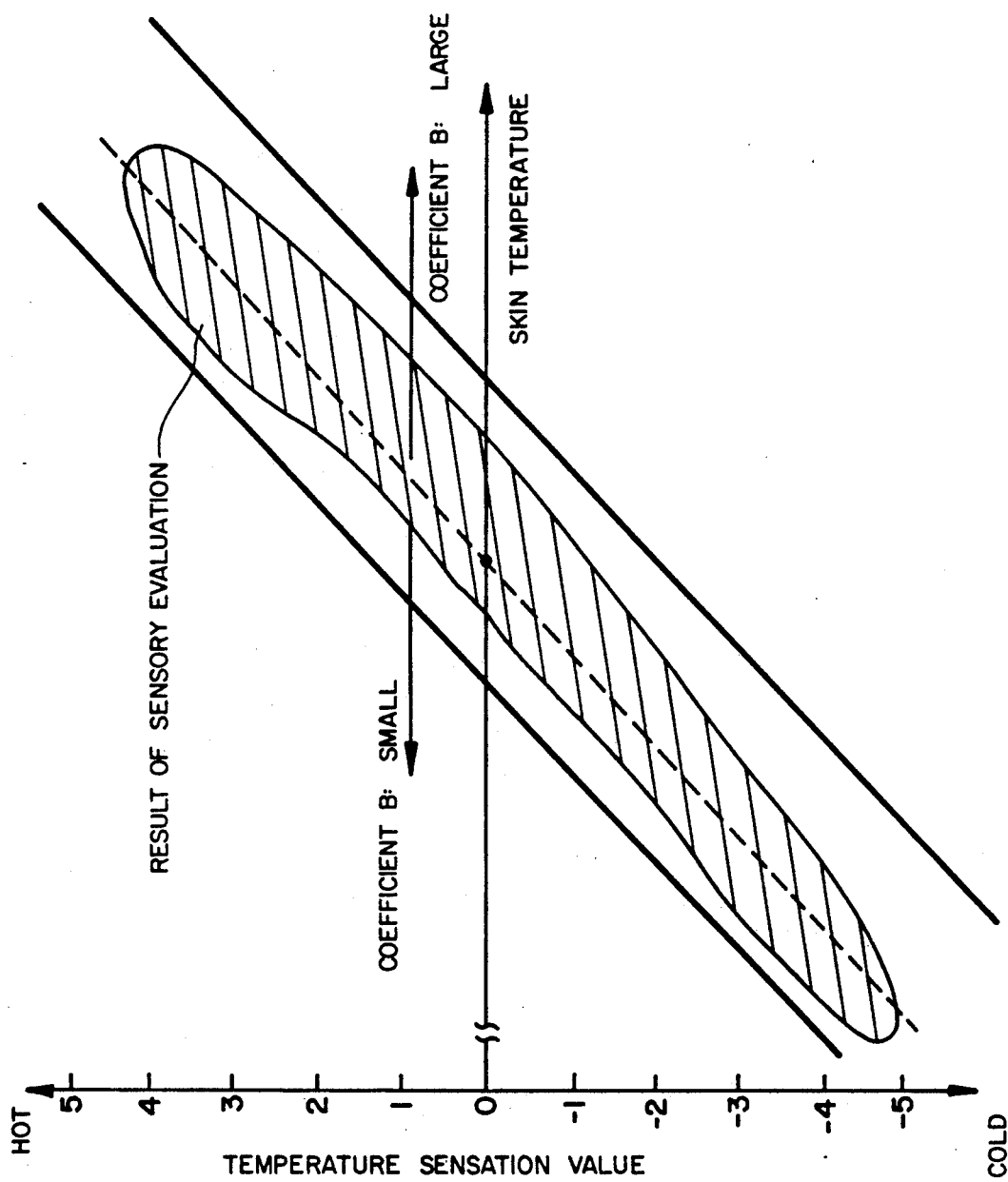
FIG. 8 is a diagram illustrating a coefficient B.

In this embodiment, the temperature sensation is quantified as follows: If the temperature sensation value is expressed by the aforementioned Formula (2), the first term on the right-hand side indicates a contribution of facial skin temperature to the temperature sensation value, and if the rate of change in the facial skin temperature is fixed, coefficient A indicates a difference (gradient) in the temperature sensation value with respect to the difference in skin temperature, as shown in FIG. 7. Meanwhile, coefficient B is used to make skin temperature and the quantified temperature sensation (temperature sensation value) correspond to the gradient determined by coefficient A, as shown in FIG. 8.

The width of coefficient A takes into consideration differences among individuals in voted values of the temperature sensation in a sensory test. If coefficient A deviates from a specified range, it shows a characteristic of the difference in an unrealistic temperature sensation with respect to the difference in the skin temperature. That is, if coefficient A is excessively large, it follows that the temperature sensation is estimated with sensitivity which cannot actually occur. On the other hand, if coefficient A is excessively small, the temperature sensation is estimated with a dullness which cannot actually occur. In either case, the estimation of the temperature sensation is impossible, and air-conditioning control cannot be effected properly. Meanwhile, the width of coefficient B also takes into consideration differences among individuals in the same way as coefficient A. If coefficient B deviates from a specified range and becomes excessively large or small, it follows that the temperature sensation is made to correspond to an unrealistic skin temperature. In either case, the estimation of the temperature sensation is impossible, and air-conditioning control cannot be effected properly.

Figure 9:
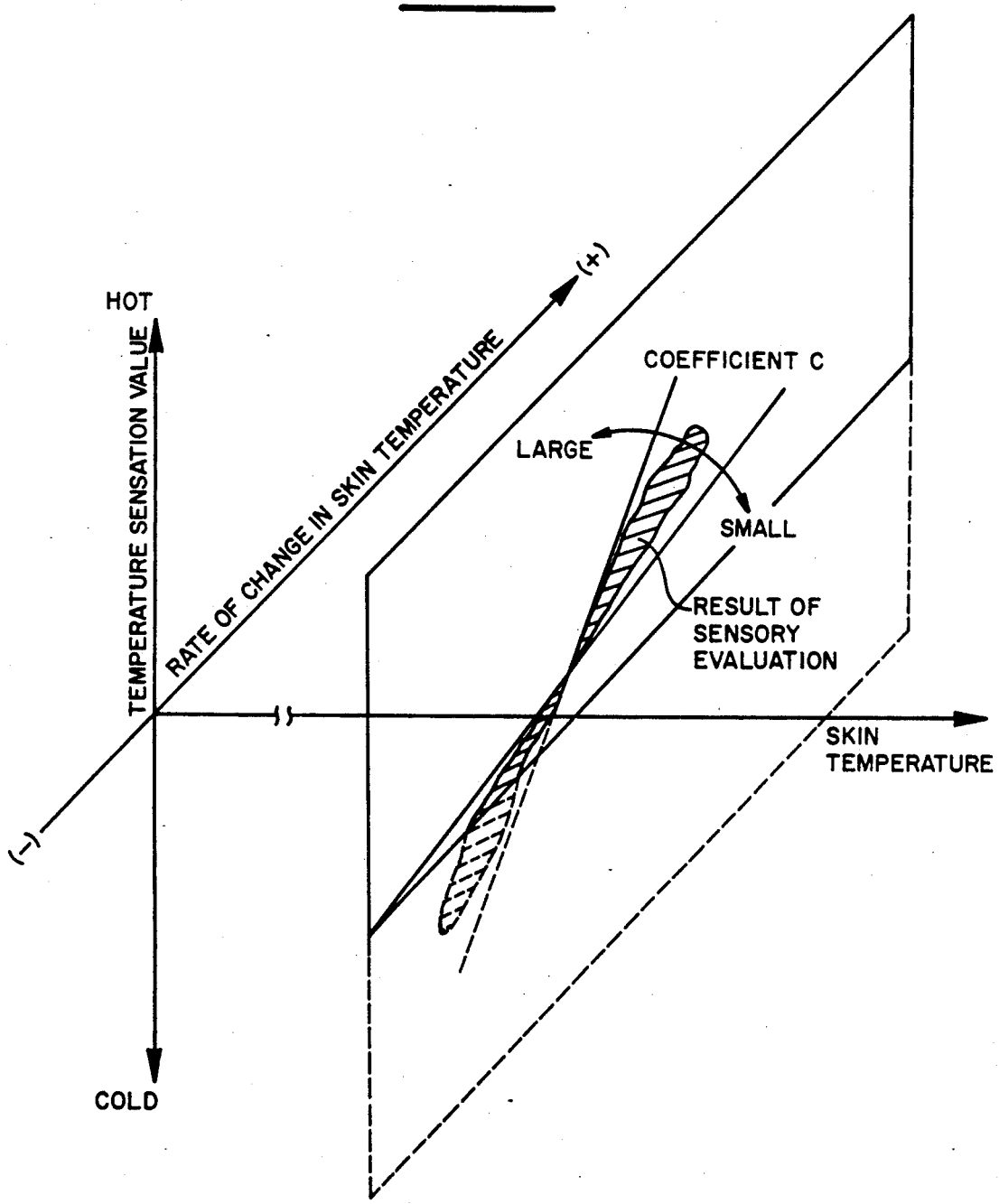
FIG. 9 is a diagram illustrating a coefficient C.

Meanwhile, as shown in FIG. 9, coefficient C shows a degree of contribution of the rate of change in skin temperature to the temperature sensation. If skin temperature drops (the rate of change in the skin temperature is negative), the quantified temperature sensation assumes a small value, whereas if the skin temperature rises (the rate of change in the skin temperature is positive), the quantified temperature sensation assumes a large value, so that coefficient C itself becomes a positive value. The width of coefficient C takes differences among individuals into consideration. If coefficient C deviates from a specified range and approaches 0, it follows that the contribution of the change in skin temperature to the temperature sensation is evaluated to be excessively smaller than in the actual case. Conversely, if coefficient C deviates from the specified range and becomes excessively large, the contribution of the change in skin temperature to the temperature sensation is evaluated to be excessively greater than in the actual case. In either case, it is impossible to estimate the temperature sensation when skin temperature changes during the initial period after air-conditioning starts and during fluctuations of thermal load due to exposure to the sun's rays, ambient temperature, etc., thereby making it impossible to effect air-conditioning control properly.

The present inventors conducted a multiplicity of sensory evaluation tests for examining the relationship between temperature sensation values quantified as shown below and facial skin temperature (including the rate of change). As a result of analyzing the results of the sensory evaluation tests through multiple regression analysis, it was found that 0.81, 33.9, and 39.1 are optimal as coefficients A, B, and C, respectively.

Figure 10:
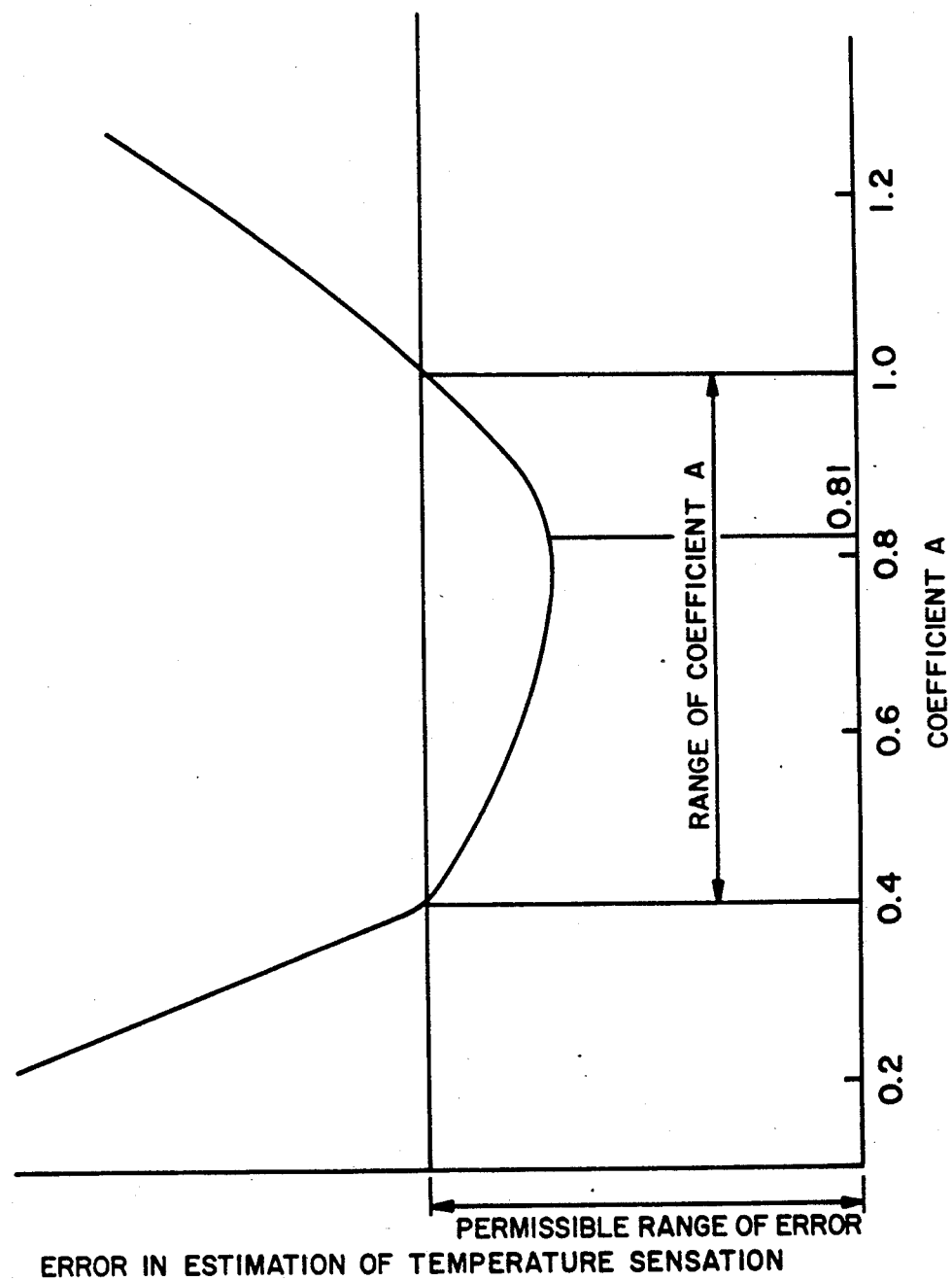
FIG. 10 is a diagram illustrating relationships between a temperature sensation estimation error and the coefficient A with the coefficients B, C fixed.
Figure 11:
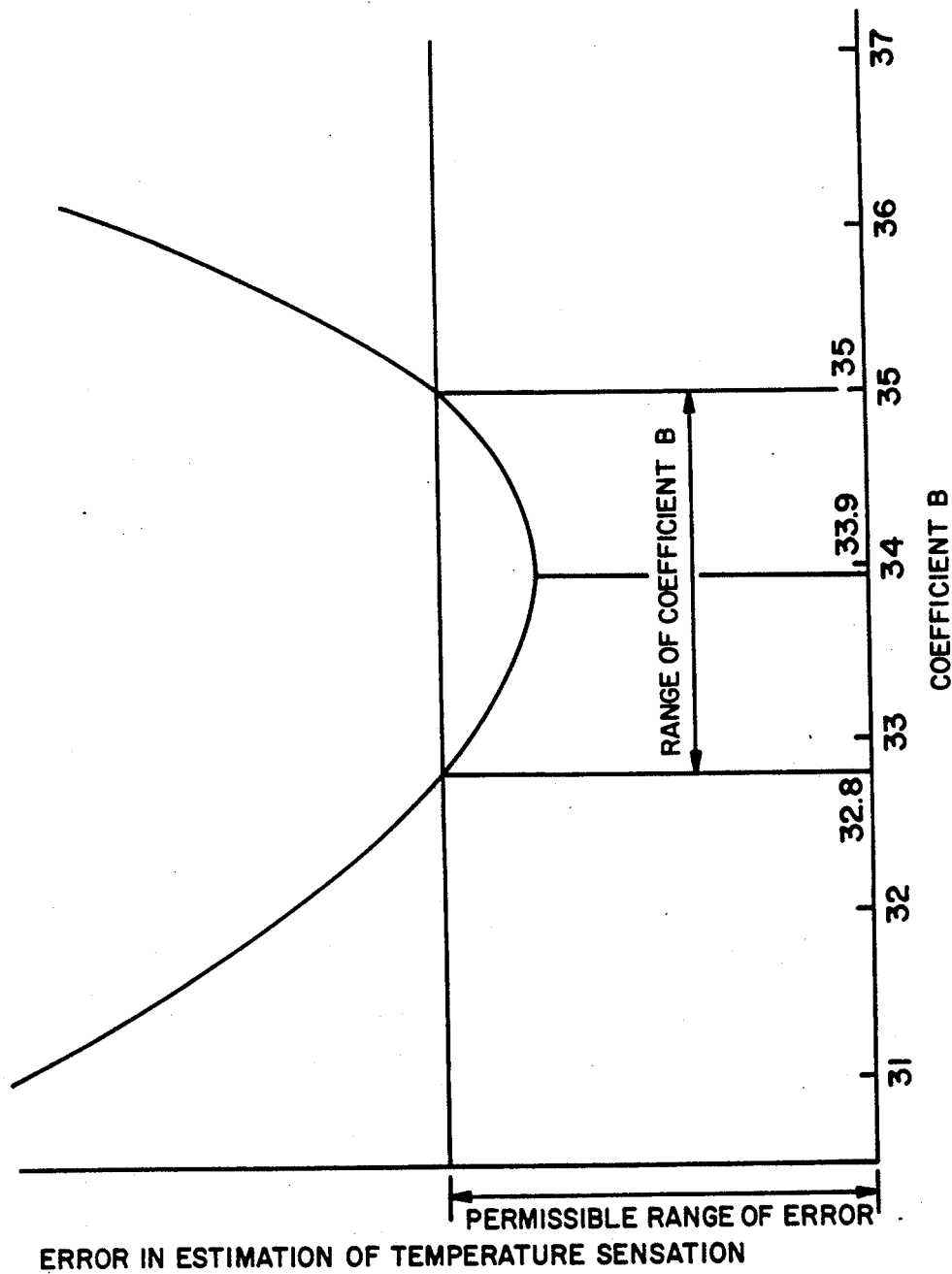
FIG. 11 is a diagram illustrating relationships between the temperature-sensation estimation error and the coefficient B with the coefficients A, C fixed.
Figure 12:
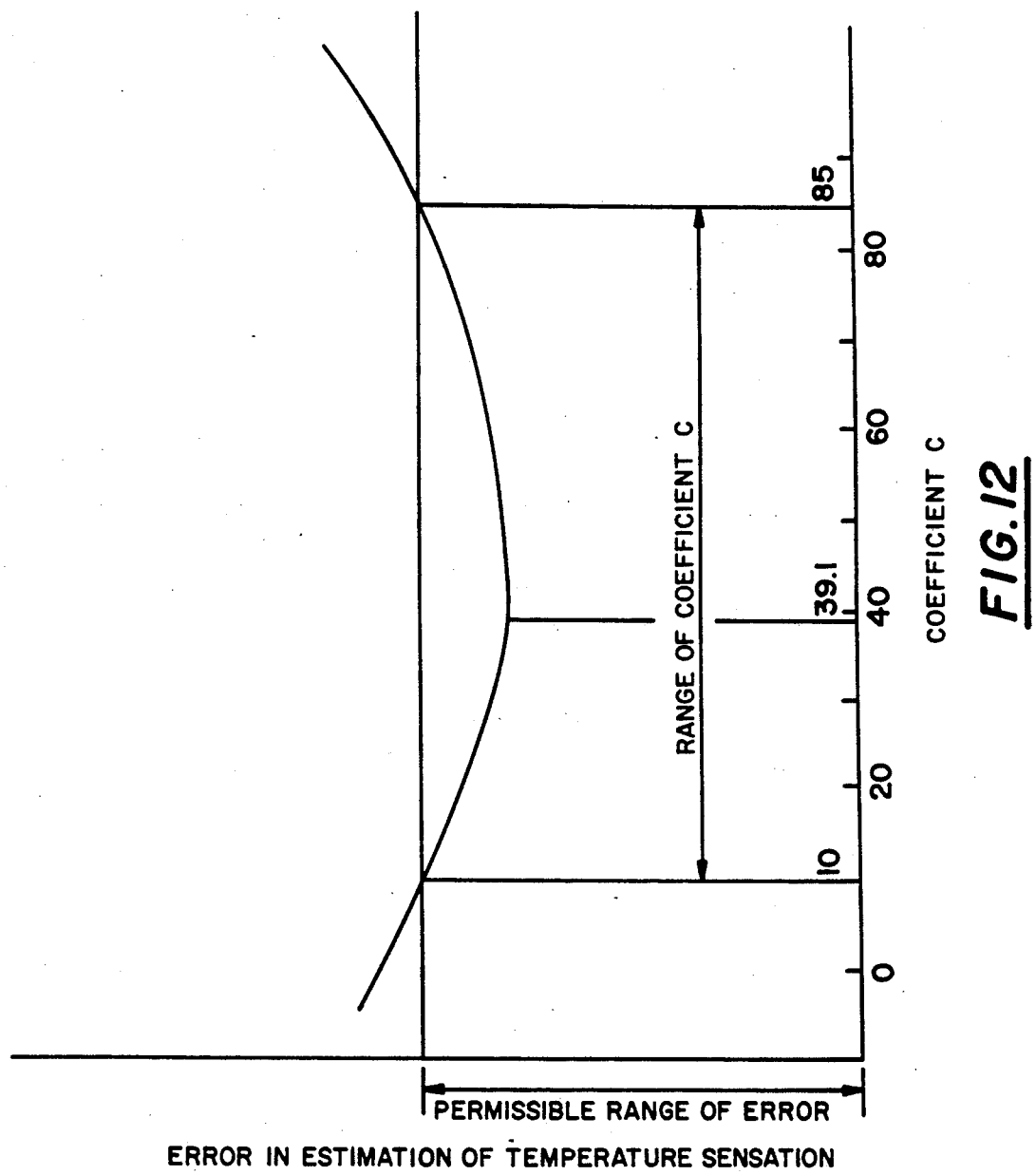
FIG. 12 is a diagram illustrating relationships between the temperature-sensation estimation error and the coefficient C with the coefficients A, B fixed.

5: very hot, 4: hot, 3: slightly hot
2: warm, 1: slightly warm, 0: neither warm nor cool,
−1: slightly cool, −2: cool, −3: slightly cold,
−4: cold, −5: very cold In addition, the ranges of coefficients A, B, and C were determined from permissible ranges of differences among individual subjects in selection of their declared values in the aforementioned sensory evaluation tests, and from permissible ranges of errors in estimation of temperature sensation values when used in air-conditioning control, as follows. As for coefficient A, errors in estimation of temperature sensation values were examined in a case where coefficient A was varied with coefficients B and C set at optimum values, as shown in FIG. 10. If the permissible range of these errors was set at ±1, the range of 0.4–1.0 was suitable as the range of coefficient A. As for coefficient B, the relationship between coefficient B and errors in estimation of the temperature sensation was examined by varying coefficient B with coefficients A and C set at optimum values, as shown in FIG. 11. If the permissible range of errors was set at ±1, the range of 32.8–35.0 was suitable as the range of coefficient B. As for coefficient C, the relationship between coefficient C and errors in estimation of the temperature sensation was examined by varying coefficient C with coefficients A and B set at optimum values, as shown in FIG. 11. If the permissible range of errors was set at ±1, the range of 10.0–85.0 was suitable as the range of coefficient C.

Figure 13:
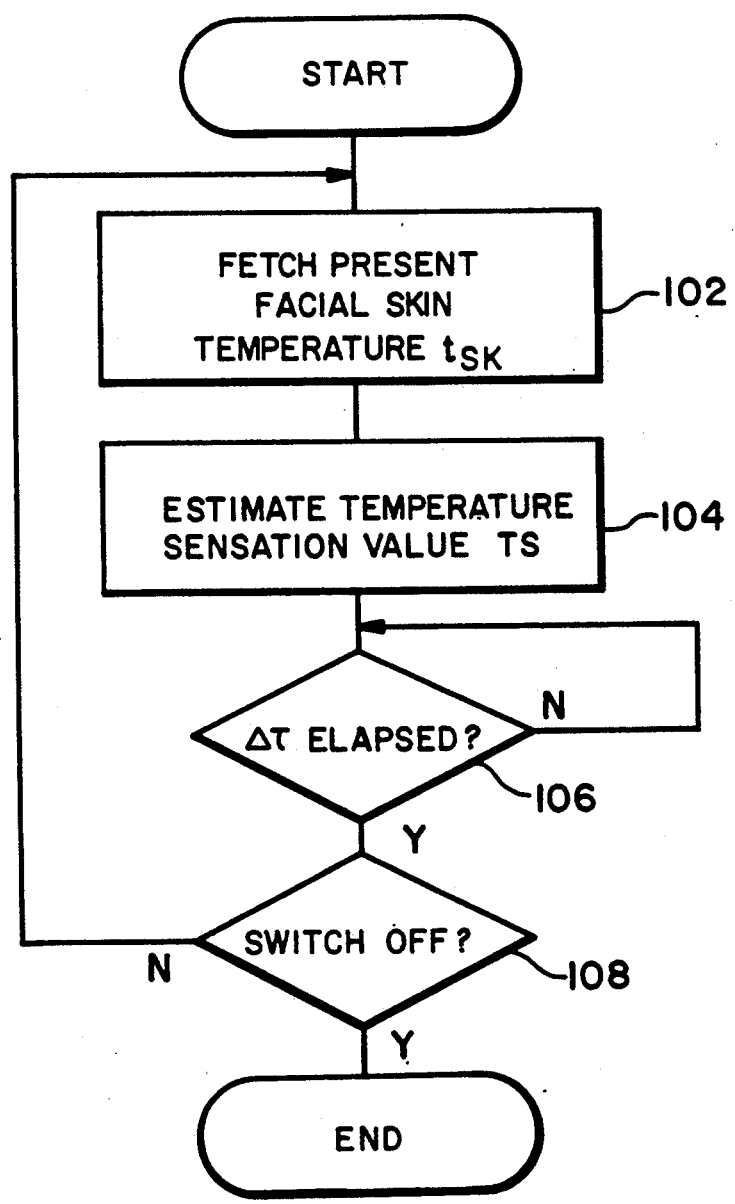
FIG. 13 is a flowchart illustrating a routine for estimating a temperature sensation value in accordance with the first embodiment.

A description will now be given of a control routine in accordance with this embodiment. FIG. 13 shows a routine for estimating a temperature sensation value by using the temperature-sensation estimating computer 30. In Step 102, present facial skin temperature $t_{SK}$ detected by the facial skin temperature detector 28 is fetched. In Step 104, the temperature sensation value TS is estimated in accordance with Formula (2) described above. In Step 106, a determination is made as to whether or not a time $\Delta\tau sec$ has elapsed. If YES is the answer, a determination is made in an ensuing Step 108 as to whether or not the switch of the air-conditioner has been turned off. If the switch of the turned off, this routine is ends. If the switch has not been turned off, the operation returns to Step 102 to repeat the foregoing routine. It should be noted that the rate of change in facial skin temperature in Formula (2) is given by (present facial skin temperature-facial skin temperature before $\Delta\tau sec)/\Delta\tau$.

Figure 14:
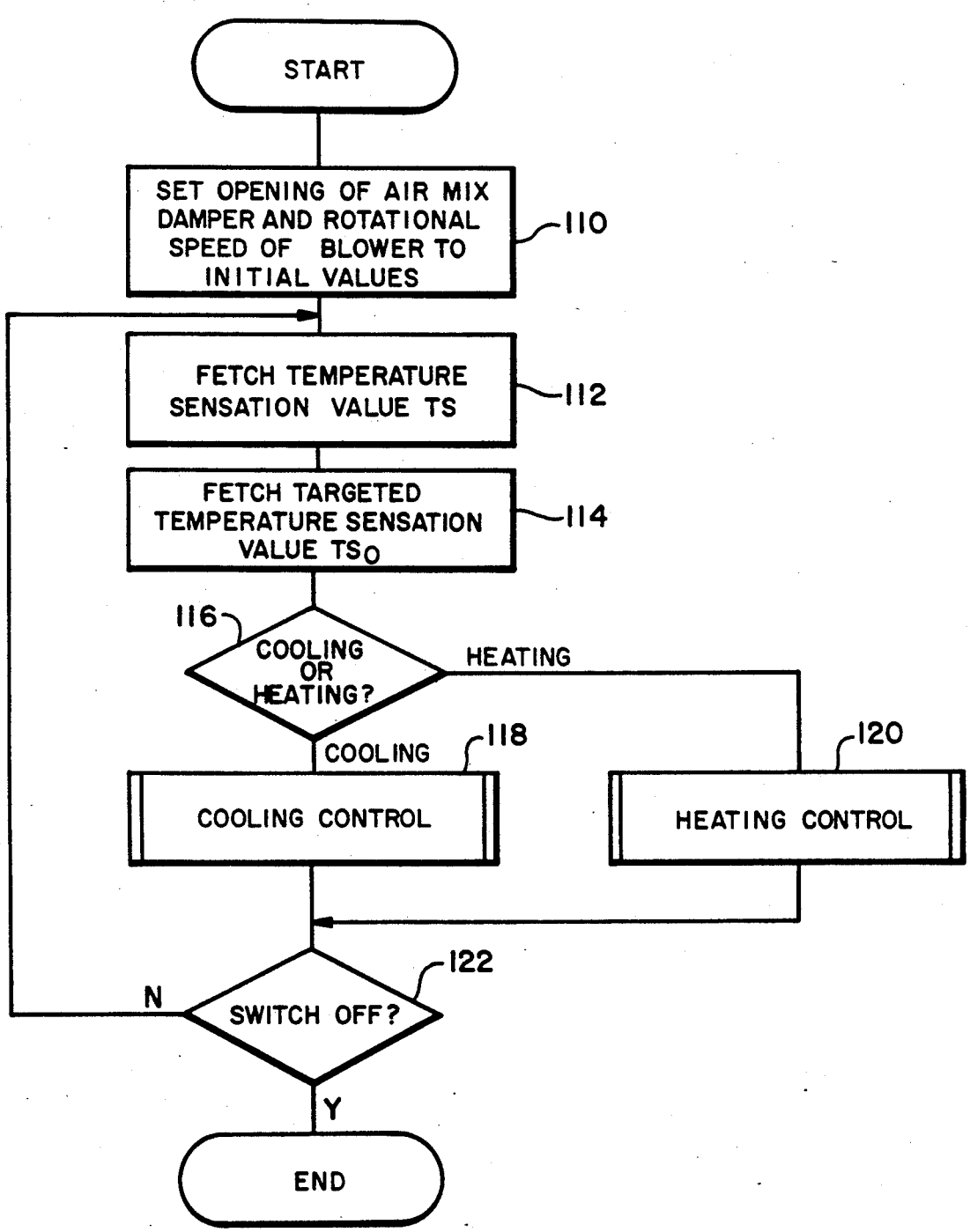
FIG. 14 is a flowchart illustrating an air-conditioning control routine in accordance with the first embodiment.

FIG. 14 shows a routine for controlling the blower voltage regulator 22 and the air mix damper opening regulator 24 by means of the air-conditioning control computer 32. In Step 110, the rotational speed of the blower 10 and the opening of the air mix damper 16 are set at initial values. In Step 112, the temperature sensation value TS estimated by the temperature-sensation estimating computer 30 is fetched, and in Step 114 the targeted temperature sensation value $TS_0$ set by the device 26 for inputting a targeted temperature sensation value is fetched. In Step 116, a determination is made as to whether cooling or heating is to be effected. In the case of cooling, cooling control is effected in Step 118, and in the case of heating, heating control is effected in Step 120. In Step 122, a determination is made as to whether or not the switch of the air-conditioner has been turned off. If the switch has been turned off, this routine is ends. If it is still on, the operation returns to Step 112 to repeat the foregoing control.

Figure 15:
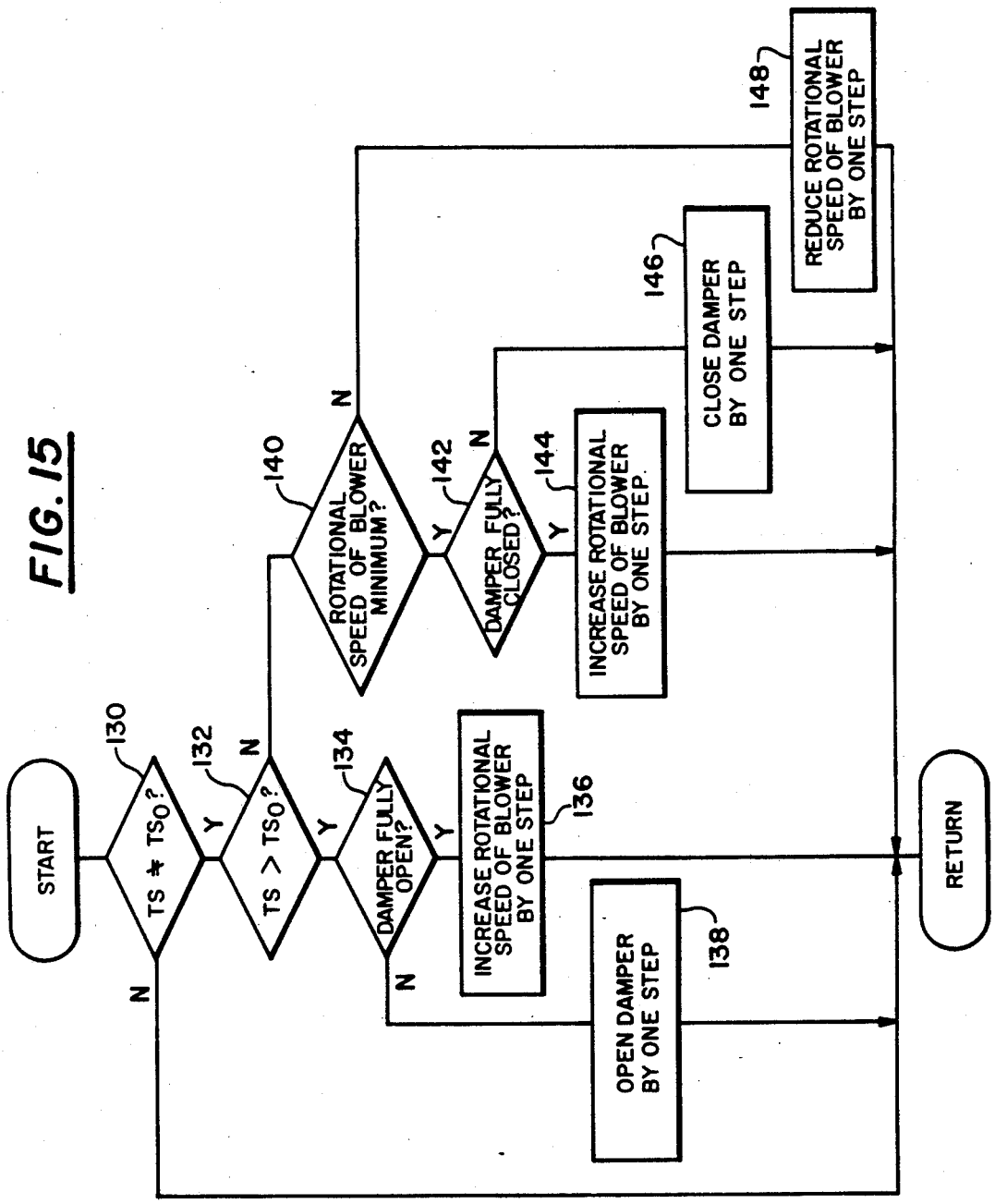
FIG. 15 is a flowchart illustrating details of a cooling control routine.

FIG. 15 shows details of the cooling control of Step 118. In Step 130, a comparison is made between the estimated temperature sensation value TS and the targeted temperature sensation value $TS_0$. If $TS=TS_0$, since the estimated value equals the targeted value, the opening of the air mix damper and the rotational speed of the blower are maintained in their present state. If $TS \neq TS_0$, in Step 132, a comparison is made between the temperature sensation value TS and the targeted temperature sensation value $TS_0$. If $TS > TS_0$, from the level of the signal being supplied to the air mix damper opening regulator 24, in Step 134, a determination is made as to whether or not the opening of the air mix damper 16 is fully open. If the opening of the air mix damper 16 is fully open, since the opening of the air mix damper 16 cannot be made greater for controlling the temperature sensation value to the targeted value, the rotational speed of the blower 10 is increased by one step by controlling the blower voltage regulator 22, thereby increasing the amount of air. Meanwhile, if the opening of the air mix damper 16 is not fully open, in Step 138, the opening of the air mix damper 16 is opened by a predetermined step by controlling the air mix damper opening regulator 24.

On the other hand, if $TS < TS_0$, a determination is made in Step 140 as to whether or not the rotational speed of the blower 10 is at a minimum. If the rotational speed of the blower 10 is not at a minimum, the rotational speed of the blower 10 is decreased by one step in Step 148. If the rotational speed of the blower 10 is at a minimum, a determination is made in Step 142 as to whether or not the air mix damper 16 is fully closed. If the air mix damper 16 is fully closed, the rotational speed of the blower 10 is increased by one step in Step 144. If the air mix damper 16 is not fully closed, in Step 146, the opening of the air mix damper 16 is controlled in a direction in which it is closed by one step.

Figure 16:
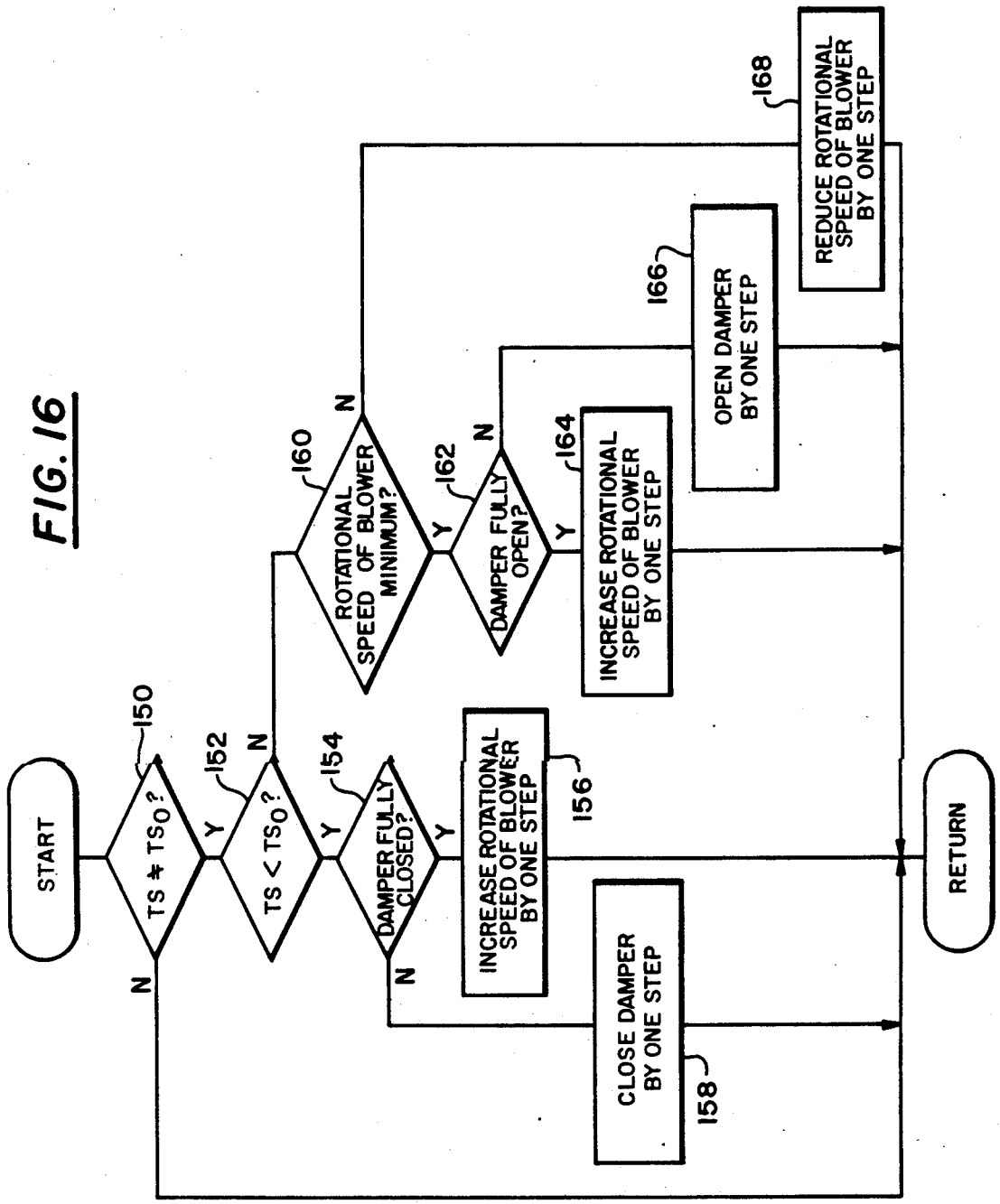
FIG. 16 is a flowchart illustrating details of a heating control routine.

FIG. 16 shows details of the heating control of Step 120. In Step 150, a comparison is made between the estimated temperature sensation value TS and the targeted temperature sensation value $TS_0$. If $TS=TS_0$, the operation returns so as to maintain the opening of the air mix damper and the rotational speed of the blower in their present state. If $TS \neq TS_0$, in Step 152, a comparison is made between the temperature sensation value TS and the targeted temperature sensation value $TS_0$. If $TS < TS_0$, a determination is made in Step 154 as to whether or not the air mix damper 16 is fully closed. If the air mix damper 16 is fully closed, the rotational speed of the blower 10 is increased by one step in Step 156. If the air mix damper 16 is not fully closed, in Step 158, the opening of the air mix damper 16 is controlled in a direction in which it is closed by one step.

Meanwhile, if $TS > TS_0$, a determination is made in Step 160 as to whether or not the rotational speed of the blower 10 is at a minimum. If the rotational speed of the blower 10 is not at a minimum, the rotational speed of the blower 10 is decreased by one step in Step 168. If the rotational speed of the blower 10 is at a minimum, a determination is made in Step 162 as to whether or not the air mix damper 16 is fully closed. If the air mix damper 16 is fully closed, the rotational speed of the blower 10 is increased by one step in Step 164. If the air mix damper 16 is not fully closed, in Step 166, the opening of the air mix damper 16 is controlled in a direction in which it is closed by one step.

Figure 17:
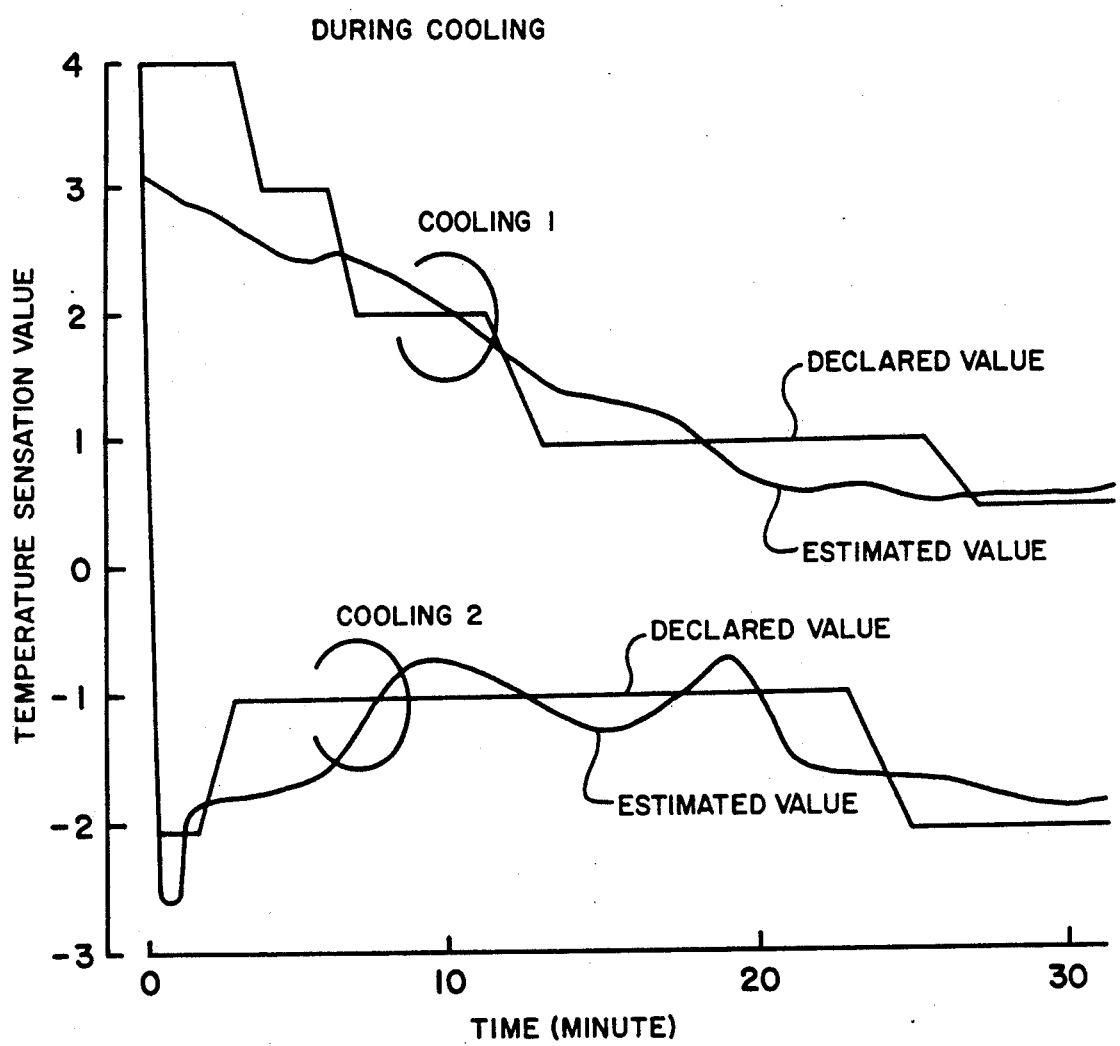
FIG. 17 is a diagram illustrating changes in an estimated value of a temperature sensation value according to the first embodiment and in a declared value thereof according to a sensory test.
Figure 18:
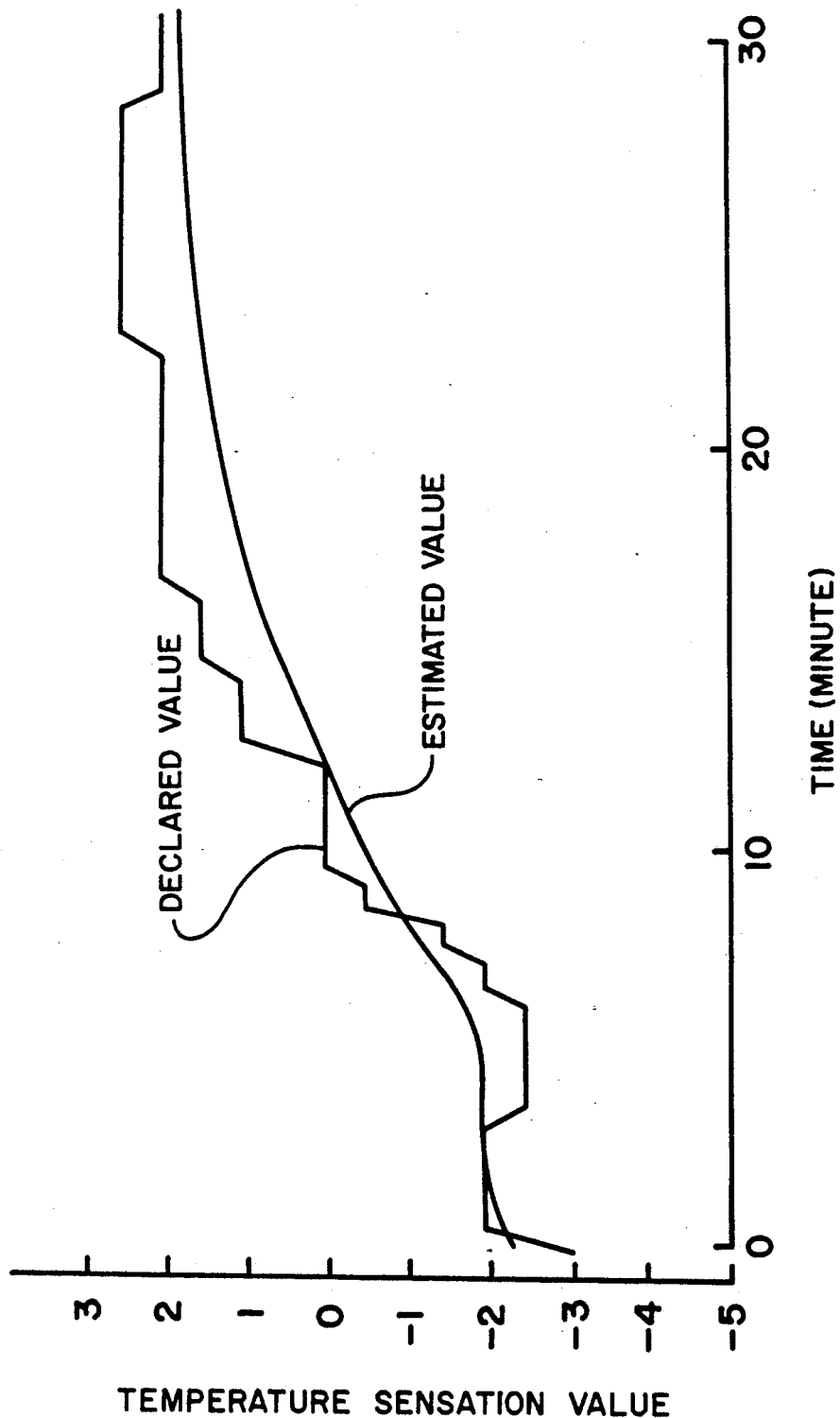
FIG. 18 is a diagram illustrating changes in the estimated value and declared value of the temperature sensation value during heating.

FIG. 17 shows changes in temperature sensation values with respect to time during cooling when the above-described control is effected. Cooling 1 is a cooling method in which the contribution of the rate of change in the skin temperature during an early period is small, while Cooling 2 is a cooling method in which the contribution of the rate of change in skin temperature during an early period is large. As can be appreciated from the drawing, in both Cooling 1 and Cooling 2, the estimated value of the temperature sensation value according to this embodiment changes with a similar tendency to that of the declared value according to a sensory test. In addition, FIG. 18 shows changes of the temperature sensation value during heating when control is effected as described above. During heating as well, the estimated value of the temperature sensation value changes similar to that of the declared value according to the sensory test.

It should be noted that although the above description has been given as an example in which an infrared radiation thermometer capable of measuring temperature in a non-contact state is used, it is possible to use a detector which measures skin temperature in contact with the skin, such as a thermistor and a thermocouple. Furthermore, although the blow port described above is oriented toward the occupant's face, the blow port may be oriented toward his or her feet.

Second Embodiment

Figure 19:
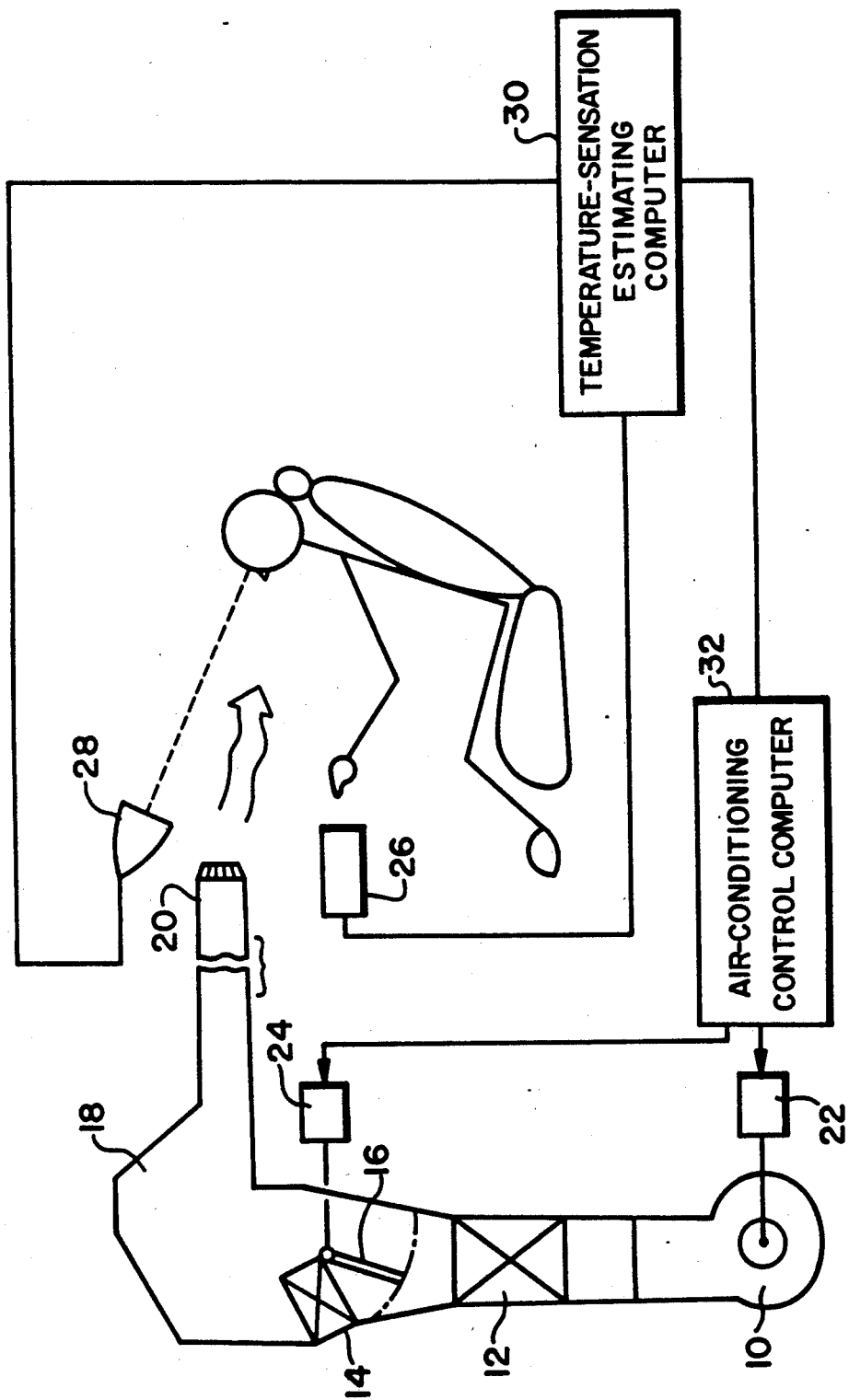
FIG. 19 is a block diagram illustrating a second embodiment of the present invention.
Figure 20:
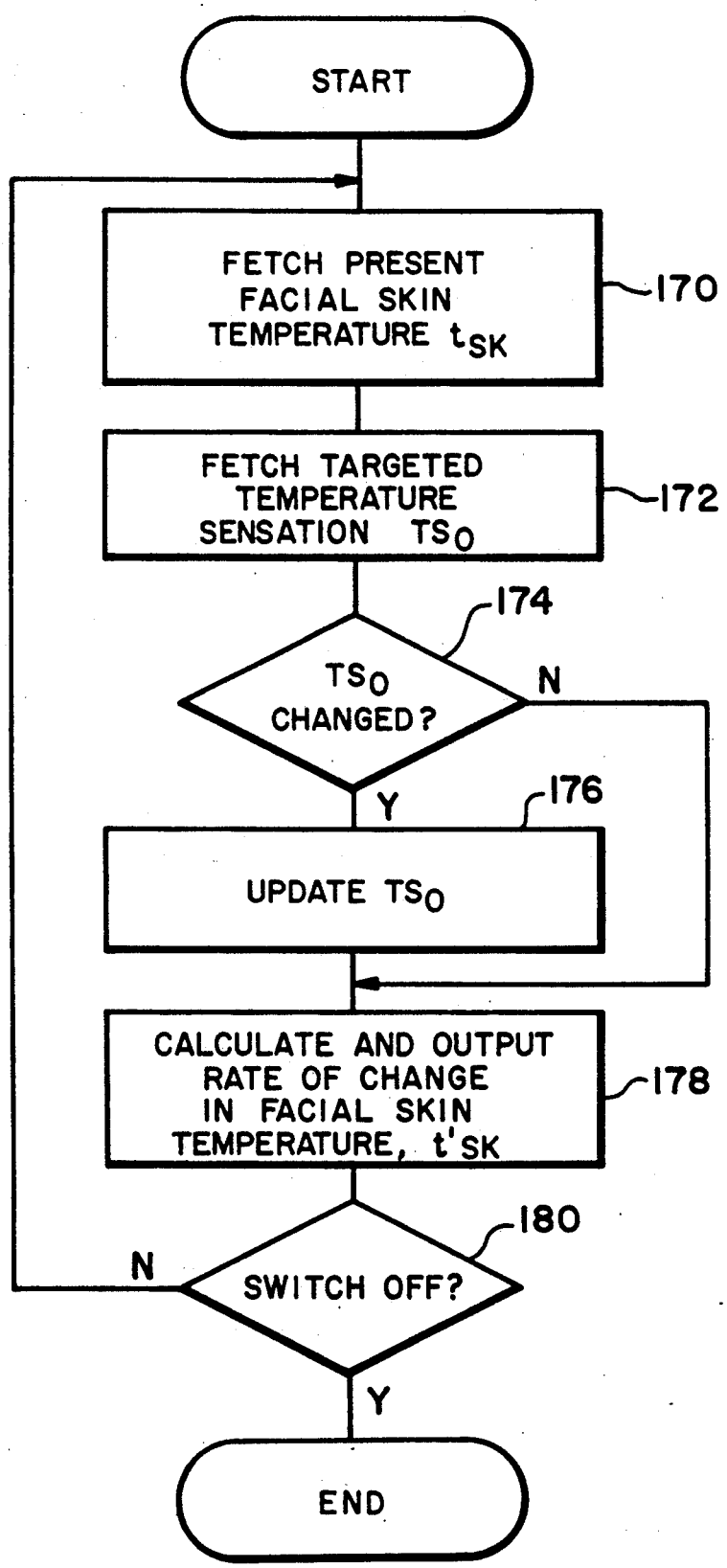
FIG. 20 is a flowchart illustrating a routine for calculating a rate of change in facial skin temperature in accordance with the second embodiment.

A description will not be given of a second embodiment of the present invention. It should be noted that in FIG. 19 those components or portions that correspond to those of FIG. 4 are denoted by the same reference numerals, and a description thereof will be omitted. In this embodiment, unlike the first embodiment, the device 26 for inputting a targeted temperature sensation value is connected to the temperature-sensation estimating computer 30. In addition, in this embodiment, the rate of change in facial skin temperature, $t'_{SK}$, is calculated through the following Formula (3) under the assumption that $TS = TS_0$:

$$t'_{SK} = \{TS_0 - A \times (t_{SK} - B)\}/C \quad (3)$$

where,
- $t'_{SK}$: rate of change in skin temperature (°C./s) for attaining the targeted temperature sensation value $TS_0$
- $t_{SK}$: present facial skin temperature (°C.)
- $TS_0$: targeted temperature sensation value
- A, B, and C: the same coefficients as those of the aforementioned Formula (2) for estimating a temperature sensation value A description will now be given of a control routine in accordance with this embodiment. FIG. 20 is a flowchart illustrating a routine of the temperature-sensation estimating computer 30 for calculating the rate of change in facial skin temperature, $t'_{SK}$. In Step 170, present facial skin temperature $t_{SK}$ detected by the facial skin temperature detector 28 is fetched. In Step 172, the targeted temperature sensation value $TS_0$ set by the device 26 for inputting a targeted temperature sensation value is fetched. In Step 174, a determination is made as to whether or not the targeted temperature sensation value $TS_0$ fetched in Step 172 has been changed from a previous value. If it has been changed, the targeted temperature sensation value $TS_0$ is changed in Step 176. Next, in Step 178, the rate of change in facial skin temperature, $t'_{SK}$, is calculated in accordance with the above Formula (3) and is outputted. In Step 180, a determination is made as to whether or not the switch of the air-conditioner has been turned off. If the switch has been turned off, this routine ends, while if it is still on, the aforementioned steps are repeated.

Figure 21:
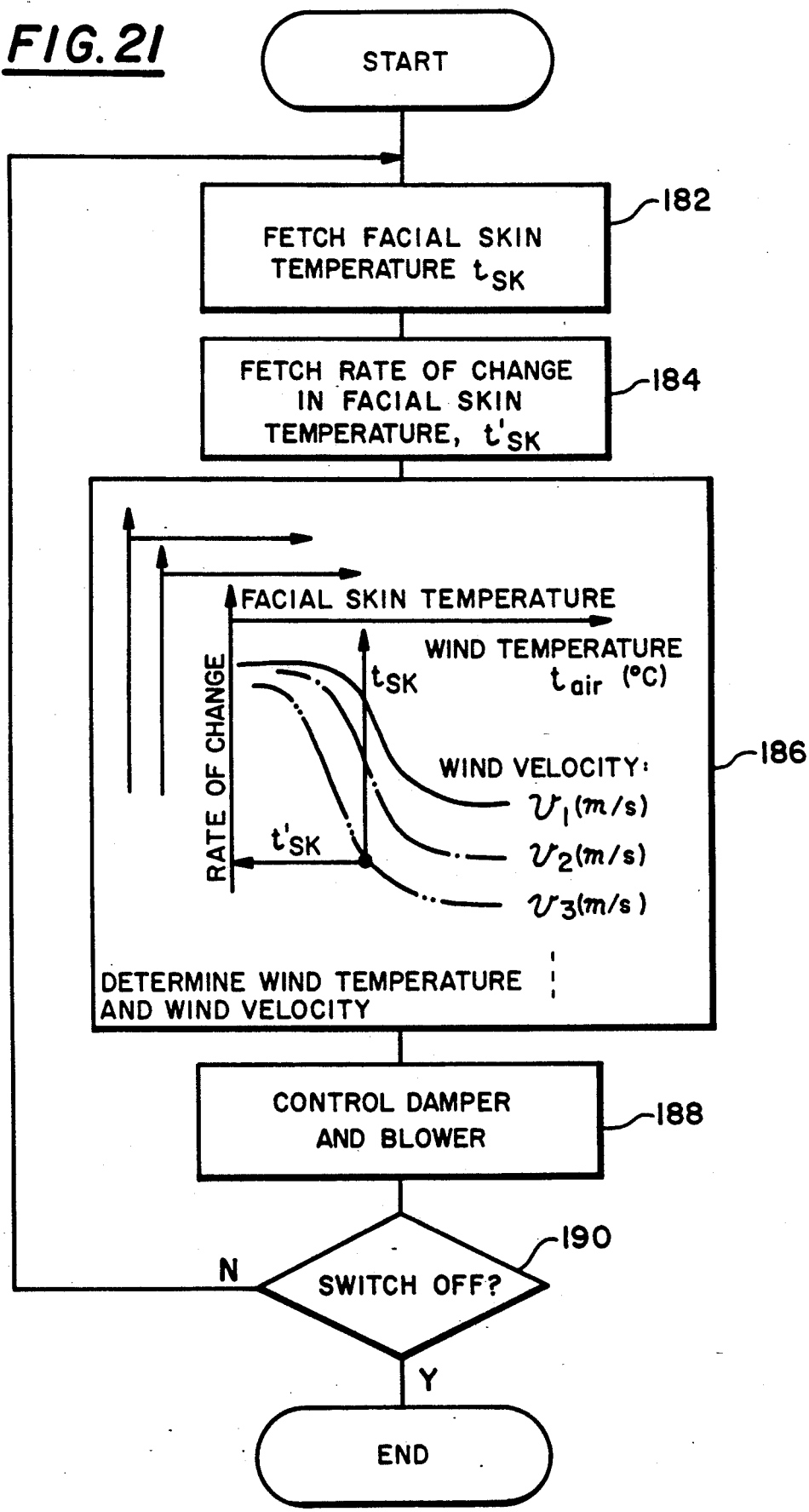
FIG. 21 is a flowchart illustrating an air-conditioning control routine in accordance with the second embodiment.

FIG. 21 shows a control routine for controlling the blower voltage regulator 22 and the air mix damper opening regulator 24 by means of the air-conditioning control computer 32. In Step 182, the facial skin temperature $t_{SK}$ detected by the facial skin temperature detector 28 is fetched via the temperature-sensation estimating computer 30. In Step 184, the rate of change in facial skin temperature, $t'_{SK}$, calculated in Step 178 is fetched. In an ensuing Step 186, the air temperature and the wind velocity which correspond to facial skin temperature $t_{SK}$ in Step 182 and the rate of change in facial skin temperature, $t'_{SK}$, in Step 184 are determined using a map of wind velocities $v_1, v_2, \ldots$ (m/s) that are determined for each air temperature $t_{air}$ in correspondence with the rate of change in skin temperature and facial skin temperature. In Step 188, the blower 10 and the air mix damper 16 are controlled via the blower voltage regulator 22 and the air mix damper opening regulator 24 in such a manner that the air temperature and the wind velocity determined from the map in Step 186 will be reached. In Step 190, a determination is made as to whether or not the switch of the air-conditioner has been turned off, and if the switch has been turned off, this routine is ends.

Third Embodiment

Figure 22:
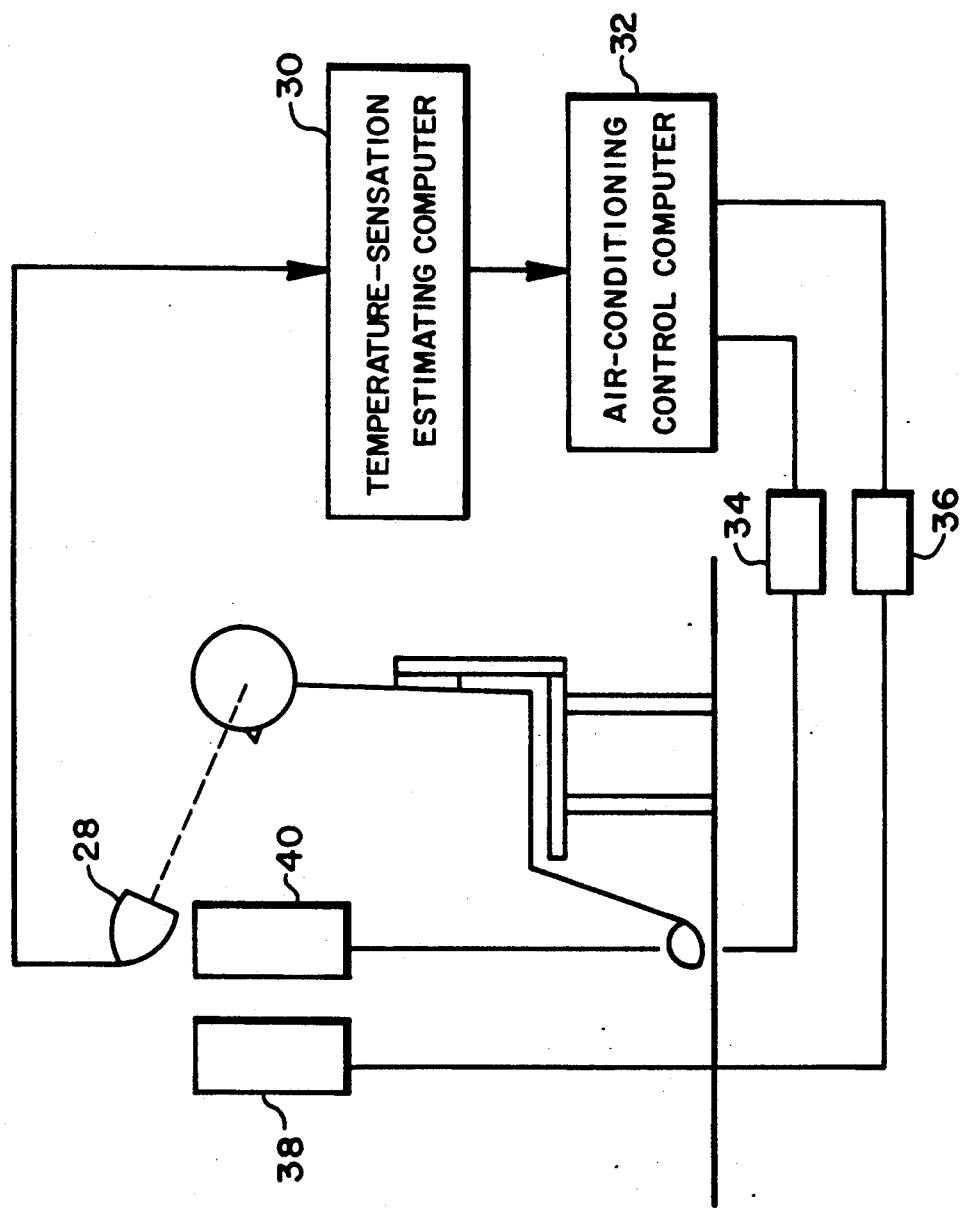
FIG. 22 is a block diagram in accordance with a third embodiment of the present invention.

A description will now be given of a third embodiment of the present invention. In this embodiment, the present invention is applied to a personal air-conditioner used in an office or the like. In this embodiment, an air-conditioner (see FIG. 22), which comprises a radiation cooler 40 constituted by thermoelectric elements and a panel heater 38 constituted by resistors adapted to generate heat upon energizing, is disposed in the vicinity of a human being. The panel heater 38 and the radiation cooler 40 of this air-conditioner are connected to the air-conditioning control computer 32 via an energizing amount regulator 36 and an energizing amount regulator 34, respectively.

Figure 23:
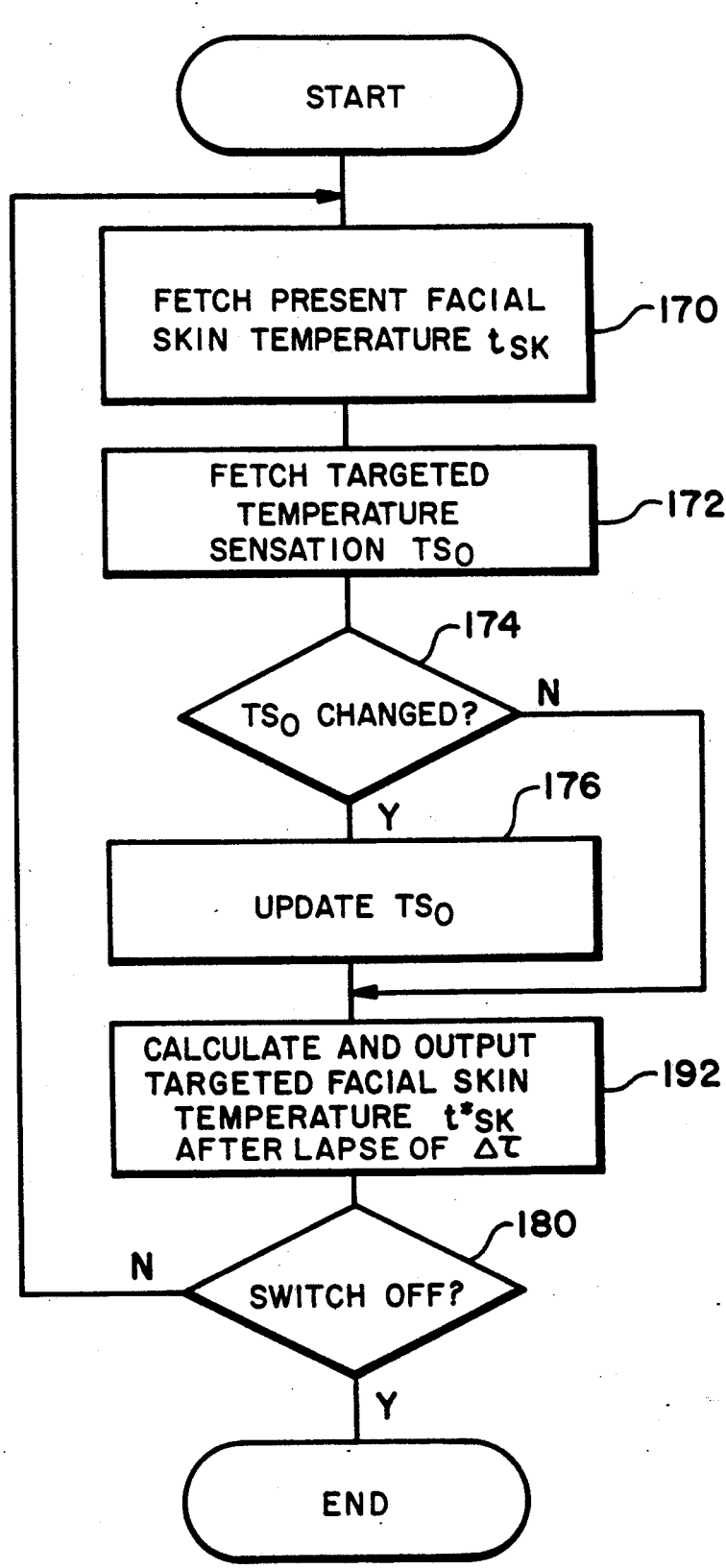
FIG. 23 is a flowchart illustrating a routine for calculating a targeted facial skin temperature $t^*_{SK}$ in accordance with the third embodiment.

Referring now to FIG. 23, a description will be given of a control routine in accordance with this embodiment. It should be noted that in FIG. 23 those components or portions that correspond to those of FIG. 20 will be denoted by the same reference numerals, and a description thereof will be omitted. In this embodiment, a targeted facial skin temperature $t^*_{SK}$ after the lapse of a predetermined time is calculated and outputted instead of the rate of change in the facial skin temperature, $t'_{SK}$.

If it is assumed that the aforementioned predetermined time is $\Delta \tau$ sec and present facial skin temperature is $t_{SK}$(°C.), the rate of change in facial skin temperature, $t'_{SK}$, can be expressed by $(t^*_{SK} - t_{SK})/\Delta \tau$. If the rate of change in facial skin temperature, $t'_{SK}$, and the targeted facial skin temperature $t^*_{SK}$ are substituted in the aforementioned Formula (2), the temperature sensation value after the lapse of $\Delta \tau$ sec is obtained as follows:

$$TS = A(t^*_{SK} - B) + C(t^*_{SK} - t_{SK})/\Delta\tau$$

In the above formula, if the temperature sensation value TS is set as the targeted temperature sensation value $TS_0$ in order to obtain the targeted facial skin temperature $t^*_{SK}$ (°C.), we have $$t^*_{SK} = \{(TS_0 + A \cdot B)\Delta\tau + C \cdot t_{SK}\}/(A \cdot \Delta\tau + C) \qquad (4)$$

Accordingly, in Step 192, the targeted facial skin temperature $t^*_{SK}$ is calculated in accordance with the aforementioned Formula (4) and is outputted.

The air-conditioning control computer 32 determines the amounts of energizing of the panel heater 38 and the radiation cooler 40 from the difference between the present facial skin temperature and the targeted facial skin temperature, thereby controlling the energizing amount regulator 34 and the energizing amount regulator 36.

It should be noted that although in the foregoing embodiments a description has been given of an automobile-use air-conditioner and a personal air-conditioner for use in an office or the like, the present invention may be used in controlling air-conditioners for use in aircraft, homes, hospitals, and the like.

What is claimed is:

1. A control apparatus for an air-conditioner, comprising:
    facial-skin-temperature detecting means for detecting a skin temperature of a human face; and
    control means for controlling said air-conditioner on the basis of a temperature sensation value TS expressed numerically by the following formula:

$$TS = \{A(t_{SK} - B) + C \cdot t'_{SK}\}\alpha + K$$

where A is a coefficient in the range of 0.4-1.0 indicating a difference in a temperature sensation value with respect to a difference in the skin temperature of the face; B is a coefficient in the range of 32.8-35.0 for making the facial skin temperature and the temperature sensation value correspond to the difference in the temperature sensation value determined by the coefficient A; C is a coefficient in the range of 10.0-85.0 indicating a contribution of the rate of change in the skin temperature to the temperature sensation value; $t_{SK}$ is a facial skin temperature; $t'_{SK}$ is a rate of change in the facial skin temperature; $\alpha$ is a value corresponding to an interval between adjacent temperature sensation values; and K is a reference value of the temperature sensation value.

2. A control apparatus for an air-conditioner according to claim 1, wherein said control means comprises:
    temperature-sensation estimating means for estimating the temperature sensation value TS expressed numerically in accordance with said formula on the basis of an output of said facial-skin-temperature detecting means; and
    air-conditioning control means for controlling said air-conditioner in such a manner that the temperature sensation value estimated by said temperature-sensation estimating means becomes a targeted temperature sensation value.

3. A control apparatus for an air-conditioner according to claim 1, wherein said control means comprises:
    calculating means for calculating the rate of change in the facial skin temperature for attaining a targeted temperature sensation value on the basis of present facial skin temperature detected by said facial-skin-temperature detecting means and said formula; and
    air-conditioning control means for controlling said air-conditioner in such a manner that the temperature sensation value becomes the targeted temperature sensation value on the basis of the present facial skin temperature detected by said facial-skin-temperature detecting means and the rate of change in the facial skin temperature calculated by said calculating means.

4. A control apparatus for an air-conditioner according to claim 1, wherein said control means comprises:
    calculating means for calculating a targeted facial skin temperature persisting after the lapse of a predetermined time for attaining a targeted temperature sensation value on the basis of a present facial skin temperature detected by said facial-skin-temperature detecting means and said formula; and
    air-conditioning control means for controlling said air-conditioner in such a manner that the temperature sensation value becomes the targeted temperature sensation value on the basis of the present facial skin temperature detected by said facial-skin-temperature detecting means and the targeted facial skin temperature calculated by said calculating means.

5. A control apparatus for an air-conditioner according to claim 1, wherein said control means effects control in such a manner that the temperature sensation value becomes a targeted temperature sensation value by controlling at least one of the temperature and the velocity of air blown out from said air-conditioner.

6. A control apparatus for an air-conditioner according to claim 1, wherein the temperature sensation value TS is determined such that the temperature sensation value TS becomes greater as the temperature sensation changes toward a higher temperature sensation, and becomes smaller as the temperature sensation changes toward a lower temperature sensation by using a neutral temperature sensation as a reference.

7. A control apparatus for an air-conditioner according to claim 1, wherein the temperature sensation value TS is determined as follows:

5: very hot, 4: hot, 3: slightly hot
    2: warm, 1: slightly warm, 0: neither warm nor cool,
    $-1$: slightly cool, $-2$: cool, $-3$: slightly cold,
    $-4$: cold, $-5$: very cold 8. A control apparatus for an air-conditioner according to claim 1, further comprising targeted temperature setting means for setting a targeted temperature sensation value.

9. A control apparatus for an air-conditioner according to claim 1, wherein facial skin temperature $t_{SK}$ is the temperature of a detecting part detected by said facial-skin-temperature detecting means.

10. A control apparatus for an air-conditioner according to claim 9, wherein said facial-skin-temperature detecting means is an infrared radiation thermometer.

11. A control apparatus for an air-conditioner according to claim 9, wherein said facial-skin-temperature detecting means is one of a thermistor and a thermocouple.

12. A control apparatus for an air-conditioner according to claim 1, wherein the facial skin temperature $t_{SK}$ is a mean value of the skin temperatures of a plurality of facial parts, and said control means converts to said mean value the temperatures of predetermined parts detected by said facial-skin-temperature detecting means, and controls said air-conditioner in such a manner that the temperature sensation value TS becomes a targeted temperature sensation value by using the converted mean value.

13. A control apparatus for an air-conditioner according to claim 1, wherein the coefficients A, B, and C are 0.81, 33.9, and 39.1 or values in the vicinity of said values, respectively.

14. A control apparatus for an air-conditioner according to claim 1, wherein $\alpha$ is 1, and K is 0.

* * * * *

UNITED STATES PATENT AND TRADEMARK OFFICE
CERTIFICATE OF CORRECTION

PATENT NO. : 5,187,943
DATED : February 23, 1993
INVENTOR(S) : Taniguchi et al It is certified that error appears in the above-identified patent and that said Letters Patent is hereby corrected as shown below:

On the title page, item:

"(73) Assignees: Kabushiki Kaisha Toyota Chuo Kenkyosho, Nagakute; Nippondenso . . . "

to

---(73) Assignees: Kabushiki Kaisha Toyota Chuo Kenkyusho, Nagakute; Nippondenso . . . ---

Signed and Sealed this

Fifteenth Day of March, 1994

Attest:

BRUCE LEHMAN

*Attesting Officer*     *Commissioner of Patents and Trademarks*